US012243377B2

(12) United States Patent
La Guardia et al.

(10) Patent No.: US 12,243,377 B2
(45) Date of Patent: Mar. 4, 2025

(54) DIGITAL LOBBY AND MULTI-GAME METAMORPHICS

(71) Applicant: Aristocrat Technologies Australia Pty Limited, North Ryde (AU)

(72) Inventors: Chad La Guardia, Austin, TX (US); Erick T. Ching, Cedar Park, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/677,599

(22) Filed: May 29, 2024

(65) Prior Publication Data

US 2024/0321041 A1 Sep. 26, 2024

Related U.S. Application Data

(63) Continuation of application No. 17/645,701, filed on Dec. 22, 2021, now Pat. No. 12,039,831, which is a (Continued)

(51) Int. Cl.
*G07F 17/32* (2006.01)

(52) U.S. Cl.
CPC ...... *G07F 17/3213* (2013.01); *G07F 17/3209* (2013.01); *G07F 17/323* (2013.01); (Continued)

(58) Field of Classification Search
CPC ............. G07F 17/3213; G07F 17/3209; G07F 17/323; G07F 17/3258; G07F 17/3267
See application file for complete search history.

(56) References Cited

U.S. PATENT DOCUMENTS

| | | | |
|---|---|---|---|
| D259,499 | S | 6/1981 | Dunham |
| 5,342,518 | A | 8/1994 | Posner |

(Continued)

FOREIGN PATENT DOCUMENTS

| | | | |
|---|---|---|---|
| AU | 630112 B | 3/1993 | |
| AU | 1997022551 A1 | 8/1997 | |

(Continued)

OTHER PUBLICATIONS

"Cashman Casino," Sep. 2018 screenshot from YouTube video. Publication date Apr. 4, 2017, 1 page.

(Continued)

*Primary Examiner* — Reginald A Renwick
(74) *Attorney, Agent, or Firm* — Weaver Austin Villeneuve & Sampson LLP

(57) ABSTRACT

A method of controlling a gaming device may involve controlling, via a control system of the gaming device that includes one or more processors, a display system of the gaming device to present a plurality of wagering game images. Each of the wagering game images may correspond to a different game theme. The method may involve controlling the display system to present a plurality of metamorphic images. Each metamorphic image may correspond to a wagering game image. Each metamorphic image also may correspond to an award of a game theme corresponding to the wagering game image. The method may involve receiving an indication of a selected game theme and controlling the display system to present first visual effects corresponding to an instance of the selected game theme and to present a metamorphic image corresponding to the selected game theme.

20 Claims, 27 Drawing Sheets

Related U.S. Application Data continuation of application No. 16/290,838, filed on Mar. 1, 2019, now Pat. No. 11,244,532.

(52) U.S. Cl.
CPC ...... *G07F 17/3258* (2013.01); *G07F 17/3267* (2013.01); *G07F 17/3239* (2013.01)

(56) References Cited

U.S. PATENT DOCUMENTS

| | | | |
|---|---|---|---|
| 5,560,603 | A | 10/1996 | Seelig |
| 5,664,998 | A | 9/1997 | Seelig |
| 5,755,621 | A | 5/1998 | Marks |
| 5,767,854 | A | 6/1998 | Anwar |
| 5,779,242 | A | 7/1998 | Kaufmann |
| 5,779,549 | A | 7/1998 | Walker |
| 6,039,648 | A | 3/2000 | Guinn |
| 6,082,887 | A | 7/2000 | Feuer |
| 6,093,100 | A | 7/2000 | Singer |
| 6,210,275 | B1 | 4/2001 | Olsen |
| 6,224,486 | B1 | 5/2001 | Walker |
| 6,270,412 | B1 | 8/2001 | Crawford |
| 6,287,202 | B1 | 9/2001 | Pascal |
| 6,293,865 | B1 | 9/2001 | Kelly |
| 6,309,299 | B1 | 10/2001 | Weiss |
| 6,354,592 | B1 | 3/2002 | Virzi |
| 6,425,828 | B2 | 7/2002 | Walker |
| 6,620,045 | B2 | 9/2003 | Berman |
| D492,692 | S | 7/2004 | Fallon |
| 6,817,948 | B2 | 11/2004 | Pascal |
| D499,786 | S | 12/2004 | Dropo |
| 6,908,390 | B2 | 6/2005 | Nguyen |
| 7,354,345 | B2 | 4/2008 | Bortnik |
| 7,393,280 | B2 | 7/2008 | Cannon |
| 7,516,959 | B2 | 4/2009 | Huard |
| D605,725 | S | 12/2009 | Chang |
| 7,682,251 | B2 | 3/2010 | Bortnik |
| 7,684,874 | B2 | 3/2010 | Schlottmann |
| 7,684,882 | B2 | 3/2010 | Baerlocher |
| 7,689,302 | B2 | 3/2010 | Schlottmann |
| 7,690,996 | B2 | 4/2010 | Iddings |
| 7,704,144 | B2 | 4/2010 | Abbott |
| 7,753,790 | B2 | 7/2010 | Nguyen |
| 7,780,520 | B2 | 8/2010 | Baerlocher |
| 7,787,972 | B2 | 8/2010 | Schlottmann |
| 7,798,901 | B2 | 9/2010 | Nguyen |
| 7,824,267 | B2 | 11/2010 | Cannon |
| 7,878,899 | B2 | 2/2011 | Duhamel |
| 7,972,209 | B2 | 7/2011 | Kelly |
| 7,976,389 | B2 | 7/2011 | Cannon |
| 8,002,630 | B2 | 8/2011 | Nguyen |
| 8,021,230 | B2 | 9/2011 | Baerlocher |
| 8,043,157 | B2 | 10/2011 | Cannon |
| 8,070,583 | B2 | 12/2011 | Baerlocher |
| 8,092,309 | B2 | 1/2012 | Bickley |
| 8,142,272 | B2 | 3/2012 | Walker |
| 8,157,647 | B2 | 4/2012 | House |
| 8,192,270 | B2 | 6/2012 | Slomiany |
| 8,202,165 | B2 | 6/2012 | Duhamel |
| 8,246,434 | B2 | 8/2012 | Moody |
| 8,246,439 | B2 | 8/2012 | Kelly |
| 8,277,298 | B2 | 10/2012 | Mace |
| 8,313,372 | B2 | 11/2012 | Naicker |
| 8,317,620 | B2 | 11/2012 | Kelly |
| 8,342,957 | B2 | 1/2013 | Carpenter |
| 8,382,572 | B2 | 2/2013 | Hoffman |
| 8,419,520 | B2 | 4/2013 | Johnson |
| 8,419,546 | B2 | 4/2013 | Decasa |
| 8,430,736 | B2 | 4/2013 | Cannon |
| 8,439,733 | B2 | 5/2013 | Kay |
| 8,449,386 | B2 | 5/2013 | Englman |
| 8,465,363 | B1 | 6/2013 | Mayeroff |
| 8,469,788 | B2 | 6/2013 | Carpenter |
| 8,485,892 | B2 | 7/2013 | Nguyen |
| 8,506,394 | B2 | 8/2013 | Kelly |
| 8,512,119 | B2 | 8/2013 | Kelly |
| 8,523,682 | B2 | 9/2013 | Bickley |
| 8,540,577 | B2 | 9/2013 | Shvili |
| 8,562,418 | B2 | 10/2013 | Gomez |
| 8,585,481 | B2 | 11/2013 | Owen |
| 8,585,494 | B2 | 11/2013 | Parrinello |
| 8,591,338 | B2 | 11/2013 | Nguyen |
| D694,773 | S | 12/2013 | Sakaguchi |
| D695,778 | S | 12/2013 | Edwards |
| 8,602,877 | B2 | 12/2013 | Carpenter |
| 8,613,650 | B2 | 12/2013 | Kovacs |
| 8,622,793 | B2 | 1/2014 | Ford |
| 8,622,817 | B2 | 1/2014 | Englman |
| 8,641,507 | B2 | 2/2014 | Kelly |
| 8,641,515 | B2 | 2/2014 | Nicely |
| 8,684,830 | B1 | 4/2014 | Chun |
| 8,690,661 | B2 | 4/2014 | Cannon |
| 8,702,499 | B2 | 4/2014 | Johnson |
| 8,702,520 | B2 | 4/2014 | Seelig |
| 8,715,051 | B2 | 5/2014 | Davis |
| 8,715,052 | B2 | 5/2014 | Bennett |
| 8,715,069 | B2 | 5/2014 | Arnone |
| 8,721,421 | B2 | 5/2014 | Tempest |
| 8,734,232 | B2 | 5/2014 | Bunch |
| D706,808 | S | 6/2014 | Edwards |
| D710,372 | S | 8/2014 | Dellinger |
| 8,801,518 | B2 | 8/2014 | Lipscomb |
| 8,808,077 | B1 | 8/2014 | Chun |
| 8,840,462 | B2 | 9/2014 | Patel |
| 8,851,980 | B2 | 10/2014 | Versaci |
| 8,851,981 | B2 | 10/2014 | Ramsey |
| 8,852,001 | B2 | 10/2014 | Kelly |
| 8,870,659 | B2 | 10/2014 | House |
| 8,894,480 | B2 | 11/2014 | Johnson |
| 8,905,841 | B2 | 12/2014 | Carpenter |
| 9,005,010 | B2 | 4/2015 | Watkins |
| 9,011,241 | B2 | 4/2015 | Kelly |
| D730,373 | S | 5/2015 | Clement |
| 9,022,867 | B2 | 5/2015 | Kelly |
| 9,033,786 | B2 | 5/2015 | Kelly |
| D732,054 | S | 6/2015 | Yoneda |
| 9,070,255 | B2 | 6/2015 | Christensen |
| 9,111,416 | B2 | 8/2015 | Cannon |
| 9,123,208 | B2 | 9/2015 | Davis |
| 9,123,210 | B2 | 9/2015 | Bennett |
| D741,897 | S | 10/2015 | Wilkinson |
| 9,155,968 | B2 | 10/2015 | Hedrick |
| 9,159,198 | B2 | 10/2015 | Moshal |
| 9,165,429 | B2 | 10/2015 | Cannon |
| 9,165,430 | B2 | 10/2015 | Bickley |
| 9,171,426 | B2 | 10/2015 | Dimichele |
| 9,177,445 | B2 | 11/2015 | Vemuri |
| 9,214,056 | B2 | 12/2015 | Kovacs |
| D750,113 | S | 2/2016 | Kettner |
| 9,286,756 | B2 | 3/2016 | Bramble |
| D753,158 | S | 4/2016 | Mezzanotte |
| 9,311,773 | B2 | 4/2016 | Chun |
| D759,065 | S | 6/2016 | Mezzanotte |
| 9,361,754 | B2 | 6/2016 | Decasa, Jr. |
| 9,364,753 | B2 | 6/2016 | Bennett |
| 9,384,631 | B2 | 7/2016 | Arnone |
| 9,384,635 | B2 | 7/2016 | Nguyen |
| 9,401,073 | B2 | 7/2016 | Lee |
| D763,904 | S | 8/2016 | Knapp |
| 9,430,908 | B2 | 8/2016 | Owen |
| 9,443,393 | B2 | 9/2016 | Johnson |
| 9,443,394 | B2 | 9/2016 | Carpenter |
| D771,670 | S | 11/2016 | Chan |
| D772,252 | S | 11/2016 | Myers |
| D772,260 | S | 11/2016 | Ingenlath et al. |
| D772,894 | S | 11/2016 | Zhao |
| 9,495,838 | B2 | 11/2016 | Davis |
| 9,520,020 | B2 | 12/2016 | Bickley |
| 9,530,280 | B2 | 12/2016 | Melnick |
| 9,558,632 | B2 | 1/2017 | Melnick |
| D780,201 | S | 2/2017 | Zielinski |
| 9,569,933 | B2 | 2/2017 | Baker |
| 9,607,479 | B2 | 3/2017 | Robbins |
| D783,655 | S | 4/2017 | Hu |

(56) References Cited

U.S. PATENT DOCUMENTS

| | | | |
|---|---|---|---|
| 9,613,492 | B2 | 4/2017 | Englman |
| 9,616,331 | B1 | 4/2017 | Jordan |
| 9,626,836 | B2 | 4/2017 | Arnone |
| 9,633,509 | B2 | 4/2017 | Cannon |
| D788,167 | S | 5/2017 | Fox Uribe |
| 9,656,174 | B1 | 5/2017 | Mclellan |
| 9,697,671 | B2 | 7/2017 | Moody |
| 9,697,674 | B2 | 7/2017 | Morrissette |
| 9,715,790 | B2 | 7/2017 | Arnone |
| 9,734,660 | B2 | 8/2017 | Kiely |
| 9,747,754 | B2 | 8/2017 | Carpenter |
| D801,990 | S | 11/2017 | Reissner |
| D804,505 | S | 12/2017 | Hoffman |
| 9,858,750 | B2 | 1/2018 | Kovacs |
| 9,984,529 | B2 | 5/2018 | Kim |
| 9,990,806 | B2 | 6/2018 | Davis |
| D823,336 | S | 7/2018 | Tinney |
| 10,013,852 | B1 | 7/2018 | Jordan |
| 10,032,338 | B2 | 7/2018 | Lark |
| 10,055,940 | B2 | 8/2018 | Arnone |
| 10,068,432 | B2 | 9/2018 | Wortmann |
| 10,109,155 | B2 | 10/2018 | Chase |
| D834,604 | S | 11/2018 | Feldman |
| D836,653 | S | 12/2018 | Zhou |
| 10,163,305 | B2 | 12/2018 | Wortmann |
| 10,195,532 | B1 | 2/2019 | Mclellan |
| 10,210,706 | B2 | 2/2019 | Penacho |
| D842,316 | S | 3/2019 | Toth |
| 10,235,841 | B2 | 3/2019 | Nguyen |
| 10,255,765 | B2 | 4/2019 | Washington |
| D847,833 | S | 5/2019 | Toth |
| D849,771 | S | 5/2019 | Foley |
| D852,830 | S | 7/2019 | Penacho |
| D854,554 | S | 7/2019 | Toth |
| 10,354,491 | B2 | 7/2019 | Melnick |
| 10,360,766 | B2 | 7/2019 | Arnone |
| 10,373,442 | B2 | 8/2019 | Schlottmann |
| 10,395,474 | B2 | 8/2019 | Englman |
| D858,535 | S | 9/2019 | Evans |
| 10,424,162 | B2 | 9/2019 | Heenan |
| D861,703 | S | 10/2019 | Suslik |
| D861,710 | S | 10/2019 | Frackelton |
| 10,445,985 | B2 | 10/2019 | Davis |
| 10,460,568 | B2 | 10/2019 | Givant |
| D867,391 | S | 11/2019 | Yoshioka |
| D868,825 | S | 12/2019 | Paulik |
| D870,123 | S | 12/2019 | Butcher |
| D870,126 | S | 12/2019 | Crispino |
| 10,504,332 | B2 | 12/2019 | Riggs |
| 10,510,215 | B2 | 12/2019 | Arnone |
| 10,515,514 | B1 | 12/2019 | Weaver |
| 10,540,852 | B2 | 1/2020 | Lark |
| D875,110 | S | 2/2020 | Spors |
| D876,450 | S | 2/2020 | Suslik |
| D876,477 | S | 2/2020 | Gansert |
| D879,122 | S | 3/2020 | Ebler |
| 10,621,829 | B2 | 4/2020 | Loader |
| D889,493 | S | 7/2020 | Schwegler |
| D890,790 | S | 7/2020 | Marks |
| D895,645 | S | 9/2020 | Sanborn |
| D896,256 | S | 9/2020 | Kawaichi |
| 10,769,881 | B1 | 9/2020 | Adams |
| 10,789,814 | B2 | 9/2020 | Palmisano |
| D898,769 | S | 10/2020 | Park |
| D905,106 | S | 12/2020 | Kang |
| D905,736 | S | 12/2020 | Felkins |
| 10,864,443 | B2 | 12/2020 | Eatedali |
| 10,872,492 | B2 | 12/2020 | Oberberger |
| D910,071 | S | 2/2021 | Chen |
| D913,325 | S | 3/2021 | Chen |
| D914,056 | S | 3/2021 | Chen |
| D916,754 | S | 4/2021 | Johnson |
| D916,903 | S | 4/2021 | Arena |
| D917,503 | S | 4/2021 | Sakurai |
| 11,055,951 | B2 | 7/2021 | La Guardia |
| 11,183,020 | B2 | 11/2021 | Berman |
| 2001/0034260 | A1 | 10/2001 | Luciano |
| 2001/0054003 | A1 | 12/2001 | Chien |
| 2002/0028707 | A1 | 3/2002 | Pascal |
| 2002/0119824 | A1 | 8/2002 | Allen |
| 2002/0183105 | A1 | 12/2002 | Cannon |
| 2003/0050831 | A1 | 3/2003 | Klayh |
| 2003/0060264 | A1 | 3/2003 | Chilton |
| 2004/0229700 | A1 | 11/2004 | Cannon |
| 2005/0020352 | A1 | 1/2005 | Chilton |
| 2005/0071024 | A1 | 3/2005 | Henshaw |
| 2005/0160003 | A1 | 7/2005 | Berardi |
| 2006/0058082 | A1 | 3/2006 | Crawford |
| 2006/0082056 | A1 | 4/2006 | Kane |
| 2006/0148565 | A1 | 7/2006 | Gauselmann |
| 2006/0157934 | A1 | 7/2006 | Yoseloff |
| 2006/0178202 | A1 | 8/2006 | Hughes |
| 2006/0287045 | A1 | 12/2006 | Walker |
| 2007/0129147 | A1 | 6/2007 | Gagner |
| 2007/0191102 | A1 | 8/2007 | Coliz |
| 2007/0218968 | A1 | 9/2007 | Snow |
| 2007/0218982 | A1 | 9/2007 | Baerlocher |
| 2007/0243936 | A1 | 10/2007 | Binenstock |
| 2008/0045288 | A1 | 2/2008 | Moshal |
| 2008/0070692 | A1 | 3/2008 | Schlottmann |
| 2008/0070693 | A1 | 3/2008 | Schlottmann |
| 2008/0070694 | A1 | 3/2008 | Schlottmann |
| 2008/0070695 | A1 | 3/2008 | Baerlocher |
| 2008/0076520 | A1 | 3/2008 | Chan |
| 2008/0146305 | A1 | 6/2008 | Moody |
| 2008/0207313 | A1 | 8/2008 | Acres |
| 2008/0254883 | A1 | 10/2008 | Patel |
| 2009/0005150 | A1 | 1/2009 | Haveson |
| 2009/0011810 | A1 | 1/2009 | Moshal |
| 2009/0011827 | A1 | 1/2009 | Englman |
| 2009/0029773 | A1 | 1/2009 | Cherry |
| 2009/0061997 | A1 | 3/2009 | Popovich |
| 2009/0061999 | A1 | 3/2009 | Popovich |
| 2009/0069093 | A1 | 3/2009 | Kelly |
| 2009/0104965 | A1 | 4/2009 | House |
| 2009/0118000 | A1 | 5/2009 | Yoshizawa |
| 2009/0124320 | A1 | 5/2009 | Dewaal |
| 2009/0124364 | A1 | 5/2009 | Cuddy |
| 2009/0170584 | A1 | 7/2009 | Tan |
| 2009/0197659 | A1 | 8/2009 | Christensen |
| 2009/0270168 | A1 | 10/2009 | Englman |
| 2009/0275374 | A1 | 11/2009 | Nelson |
| 2010/0022307 | A1 | 1/2010 | Steuer |
| 2010/0035674 | A1 | 2/2010 | Slomiany |
| 2010/0062840 | A1 | 3/2010 | Herrmann |
| 2010/0070056 | A1 | 3/2010 | Coronel |
| 2010/0105470 | A1 | 4/2010 | Englman |
| 2010/0120503 | A1 | 5/2010 | Hoffman |
| 2010/0197377 | A1 | 8/2010 | Aoki |
| 2010/0210356 | A1 | 8/2010 | Losica |
| 2010/0210362 | A1 | 8/2010 | Toompere |
| 2010/0227686 | A1 | 9/2010 | Brunet De Courssou |
| 2010/0311497 | A1 | 12/2010 | Suslik |
| 2011/0014964 | A1 | 1/2011 | Crowder, Jr. |
| 2011/0028160 | A1 | 2/2011 | Roeding |
| 2011/0070940 | A1 | 3/2011 | Jaffe |
| 2011/0111856 | A1 | 5/2011 | White |
| 2011/0130186 | A1 | 6/2011 | Chim |
| 2011/0281624 | A1 | 11/2011 | Moody |
| 2012/0122561 | A1 | 5/2012 | Hedrick |
| 2012/0129610 | A1 | 5/2012 | Mazursky |
| 2012/0225724 | A1 | 9/2012 | Barber |
| 2013/0029739 | A1 | 1/2013 | Ramsey |
| 2013/0065676 | A1 | 3/2013 | Owen |
| 2013/0072294 | A1 | 3/2013 | Mosley |
| 2013/0116809 | A1 | 5/2013 | Carpenter |
| 2013/0122978 | A1 | 5/2013 | Slomiany |
| 2013/0244751 | A1 | 9/2013 | Bennett |
| 2013/0252704 | A1 | 9/2013 | Gilbertson |
| 2013/0281179 | A1 | 10/2013 | Tempest |
| 2013/0296036 | A1 | 11/2013 | Scott |
| 2013/0310127 | A1 | 11/2013 | Bradley |
| 2013/0331181 | A1 | 12/2013 | Newton |
| 2013/0331184 | A1 | 12/2013 | Kelly |

(56) References Cited

U.S. PATENT DOCUMENTS

| | | | |
|---|---|---|---|
| 2013/0331968 | A1 | 12/2013 | Newton |
| 2014/0038703 | A1 | 2/2014 | Lampert |
| 2014/0038724 | A1 | 2/2014 | Layne, IV |
| 2014/0051520 | A1 | 2/2014 | Davis |
| 2014/0087815 | A1 | 3/2014 | Caputo |
| 2014/0106866 | A1 | 4/2014 | Hardy |
| 2014/0162787 | A1 | 6/2014 | Carpenter |
| 2014/0194176 | A1 | 7/2014 | Robbins |
| 2014/0274308 | A1 | 9/2014 | Guinn |
| 2014/0323199 | A1 | 10/2014 | Dimichele |
| 2015/0018070 | A1 | 1/2015 | Meyer |
| 2015/0099576 | A1 | 4/2015 | Anderson |
| 2015/0199878 | A1 | 7/2015 | Wright |
| 2015/0228151 | A1 | 8/2015 | Damodaran |
| 2015/0248810 | A1 | 9/2015 | Wortmann |
| 2015/0287069 | A1 | 10/2015 | Gissara |
| 2015/0348361 | A1 | 12/2015 | Adiraju |
| 2015/0355727 | A1 | 12/2015 | Hu |
| 2015/0356815 | A1 | 12/2015 | Kim |
| 2015/0379822 | A1 | 12/2015 | Ellis |
| 2016/0063807 | A1 | 3/2016 | Bennett |
| 2016/0104344 | A1 | 4/2016 | Meyer |
| 2016/0140807 | A1 | 5/2016 | Chase |
| 2016/0148126 | A1 | 5/2016 | Paleja |
| 2016/0217646 | A1 | 7/2016 | Hornik |
| 2016/0275757 | A1 | 9/2016 | Decasa, Jr. |
| 2016/0284157 | A1 | 9/2016 | Marrinson |
| 2016/0328918 | A1 | 11/2016 | De Waal |
| 2017/0161999 | A1 | 6/2017 | Givant |
| 2017/0200349 | A1 | 7/2017 | Englman |
| 2017/0323528 | A1 | 11/2017 | Arnone |
| 2017/0337775 | A1 | 11/2017 | Singer |
| 2018/0052582 | A1 | 2/2018 | Hilbert |
| 2018/0068529 | A1 | 3/2018 | Delekta |
| 2018/0075708 | A1 | 3/2018 | San |
| 2018/0089953 | A1 | 3/2018 | Palmisano |
| 2018/0089954 | A1 | 3/2018 | Carpenter |
| 2018/0095616 | A1 | 4/2018 | Valdivia |
| 2018/0130312 | A1 | 5/2018 | Cire |
| 2018/0146206 | A1 | 5/2018 | Weekes |
| 2019/0066446 | A1 | 2/2019 | Mariscal |
| 2019/0073859 | A1 | 3/2019 | Penacho |
| 2019/0080562 | A1 | 3/2019 | Jungmann |
| 2019/0096182 | A1 | 3/2019 | Oberberger |
| 2019/0102993 | A1 | 4/2019 | Washington |
| 2019/0139366 | A1 | 5/2019 | Davis |
| 2019/0147706 | A1 | 5/2019 | Bolling, Jr. |
| 2019/0244482 | A1 | 8/2019 | Washington |
| 2019/0262717 | A1 | 8/2019 | Thielbar |
| 2019/0287344 | A1 | 9/2019 | Oberberger |
| 2019/0333314 | A1 | 10/2019 | Henshaw |
| 2019/0340883 | A1 | 11/2019 | Arnone |
| 2019/0347907 | A1 | 11/2019 | Bolling, Jr. |
| 2019/0378379 | A1 | 12/2019 | Satterlie |
| 2019/0385406 | A1 | 12/2019 | Marks |
| 2020/0043233 | A1 | 2/2020 | Nelson |
| 2020/0043293 | A1 | 2/2020 | Nelson |
| 2020/0043294 | A1 | 2/2020 | Davis |
| 2020/0111293 | A1 | 4/2020 | Oberberger |
| 2020/0184775 | A1 | 6/2020 | Oberberger |
| 2020/0279451 | A1 | 9/2020 | La Guardia |
| 2020/0364987 | A1 | 11/2020 | Weaver |
| 2021/0007632 | A1 | 1/2021 | Blahnik |
| 2021/0256811 | A1 | 8/2021 | Uberuaga |
| 2023/0082153 | A1 | 3/2023 | La Guardia |

FOREIGN PATENT DOCUMENTS

| | | | |
|---|---|---|---|
| AU | 1997029346 | A1 | 11/1997 |
| AU | 1997030070 | A1 | 11/1997 |
| AU | 1997035809 | A1 | 1/1998 |
| AU | 700667 | B2 | 1/1999 |
| AU | 2001036378 | A1 | 5/2001 |
| AU | 2001294751 | A1 | 6/2002 |
| AU | 2002311978 | A1 | 12/2002 |
| AU | 755912 | B2 | 1/2003 |
| AU | 2002250161 | A1 | 7/2003 |
| AU | 2003281244 | A1 | 1/2004 |
| AU | 2004904539 | | 8/2004 |
| AU | 2005203403 | A1 | 2/2006 |
| AU | 2005285317 | A1 | 3/2006 |
| AU | 2002306874 | B2 | 6/2006 |
| AU | 2006200237 | A1 | 8/2006 |
| AU | 2007200711 | A1 | 10/2007 |
| AU | 2008100162 | B4 | 4/2008 |
| AU | 2008100163 | B4 | 4/2008 |
| AU | 2006208418 | B2 | 11/2008 |
| AU | 2007211906 | B2 | 2/2009 |
| AU | 2005235004 | B2 | 4/2009 |
| AU | 2008323670 | B2 | 5/2009 |
| AU | 2007216930 | B2 | 3/2010 |
| AU | 2007237214 | B2 | 3/2010 |
| AU | 2008200060 | B2 | 3/2010 |
| AU | 2004267734 | B2 | 7/2010 |
| AU | 2010200449 | A1 | 9/2010 |
| AU | 2005270750 | B2 | 12/2010 |
| AU | 2010202077 | A1 | 12/2010 |
| AU | 2004267733 | B2 | 1/2011 |
| AU | 2004267746 | B2 | 1/2011 |
| AU | 2005203404 | B2 | 3/2011 |
| AU | 2011200529 | A1 | 3/2011 |
| AU | 2010246507 | A1 | 6/2011 |
| AU | 2007200050 | B2 | 9/2011 |
| AU | 2006302141 | B2 | 1/2012 |
| AU | 2005248969 | B2 | 2/2012 |
| AU | 2011205125 | A1 | 3/2012 |
| AU | 2011200434 | B2 | 11/2012 |
| AU | 2010202282 | B2 | 1/2013 |
| AU | 2012268860 | A1 | 1/2013 |
| AU | 2008312413 | B2 | 9/2013 |
| AU | 2013254911 | A1 | 11/2013 |
| AU | 2014900096 | | 1/2014 |
| AU | 2013202667 | B2 | 1/2015 |
| AU | 2015201979 | A1 | 5/2015 |
| AU | 2012326136 | B2 | 6/2015 |
| AU | 2015200050 | A1 | 7/2015 |
| AU | 2013213728 | B2 | 1/2016 |
| AU | 2011307385 | B2 | 3/2016 |
| AU | 2016203321 | A1 | 6/2016 |
| AU | 2016204577 | A1 | 7/2016 |
| AU | 2014395471 | A1 | 1/2017 |
| AU | 2014317574 | B2 | 6/2017 |
| AU | 2014317575 | B2 | 6/2017 |
| AU | 2016349725 | A1 | 6/2018 |
| AU | 2018203786 | A1 | 6/2018 |
| AU | 2018203839 | A1 | 6/2018 |
| CA | 2340562 | A1 | 8/2002 |
| CA | 2536018 | A1 | 3/2005 |
| CA | 2920520 | A1 | 3/2005 |
| CA | 2538706 | A1 | 4/2005 |
| CA | 2259197 | C | 9/2005 |
| CA | 2253884 | C | 11/2005 |
| CA | 2563942 | A1 | 11/2005 |
| CA | 2580187 | A1 | 3/2006 |
| CA | 2522944 | A1 | 7/2006 |
| CA | 2527367 | A1 | 5/2007 |
| CA | 2527416 | A1 | 5/2007 |
| CA | 2403035 | C | 7/2007 |
| CA | 2572719 | A1 | 7/2007 |
| CA | 2604412 | A1 | 4/2008 |
| CA | 2617034 | A1 | 7/2008 |
| CA | 2691337 | A1 | 8/2010 |
| CA | 2812377 | A1 | 4/2012 |
| CA | 2838347 | A1 | 12/2012 |
| CA | 2852464 | A1 | 4/2013 |
| CA | 2876890 | A1 | 7/2015 |
| CA | 2947448 | A1 | 11/2015 |
| CA | 2956084 | A1 | 1/2016 |
| CA | 2535880 | C | 4/2016 |
| CA | 2599635 | C | 8/2016 |
| CA | 2535838 | C | 9/2016 |
| CA | 2941629 | A1 | 3/2017 |
| CA | 3004490 | A1 | 5/2017 |
| CA | 3017742 | A1 | 9/2017 |

(56) References Cited

FOREIGN PATENT DOCUMENTS

| | | | |
|---|---|---|---|
| CA | 3017745 | A1 | 9/2017 |
| CA | 2655095 | C | 4/2018 |
| CN | 1853203 | A | 10/2006 |
| CN | 1853204 | A | 10/2006 |
| CN | 1853205 | A | 10/2006 |
| CN | 101018592 | A | 8/2007 |
| CN | 101043923 | A | 9/2007 |
| CN | 101044523 | A | 9/2007 |
| CN | 101044525 | A | 9/2007 |
| CN | 101321564 | B | 7/2011 |
| DE | 19740287 | A1 | 3/1998 |
| EP | 1021228 | A4 | 1/2001 |
| EP | 1296294 | A3 | 2/2004 |
| EP | 1644902 | A2 | 4/2006 |
| EP | 1656647 | A1 | 5/2006 |
| EP | 1656648 | A1 | 5/2006 |
| EP | 1677263 | A3 | 4/2007 |
| EP | 1794721 | A1 | 6/2007 |
| EP | 1903522 | A1 | 3/2008 |
| EP | 1912185 | A1 | 4/2008 |
| EP | 1933960 | A2 | 6/2008 |
| EP | 2003630 | A1 | 12/2008 |
| EP | 1740281 | A4 | 2/2009 |
| EP | 1814091 | A3 | 2/2009 |
| EP | 2218487 | A3 | 8/2010 |
| EP | 2435995 | A1 | 4/2012 |
| EP | 2723462 | A4 | 11/2014 |
| EP | 2621595 | A4 | 6/2015 |
| EP | 3171951 | A4 | 12/2017 |
| EP | 3149713 | A4 | 2/2018 |
| EP | 3429710 | A2 | 1/2019 |
| EP | 3429711 | A1 | 1/2019 |
| GB | 2387950 | A | 10/2003 |
| GB | 0409224 | | 4/2004 |
| GB | 2401063 | B | 10/2006 |
| GB | 2427149 | B | 3/2007 |
| HK | 1237704 | A | 4/2018 |
| IL | 216538 | A | 2/2012 |
| IN | 201847034966 | A | 9/2018 |
| JP | 2007502658 | A | 2/2007 |
| JP | 2007502659 | A | 2/2007 |
| JP | 2007502661 | A | 2/2007 |
| JP | 5941152 | B2 | 6/2016 |
| JP | 2017518850 | A | 7/2017 |
| MO | I000434 | A | 2/2008 |
| MO | I000877 | A | 3/2009 |
| MO | I001296 | C | 5/2016 |
| MO | I001298 | C | 5/2016 |
| NZ | 703662 | A | 7/2015 |
| PH | 12018501052 | A1 | 1/2019 |
| RU | 96117375 | C1 | 9/1999 |
| SG | 131166 | A1 | 5/2007 |
| SG | 11201401444 | | 5/2014 |
| SG | 10201500175 | | 8/2015 |
| SG | 11201803977 | | 6/2018 |
| TW | 573262 | B | 1/2004 |
| WO | 1997027921 | A1 | 8/1997 |
| WO | 1997039811 | A1 | 10/1997 |
| WO | 1997041933 | A1 | 11/1997 |
| WO | 1998000210 | A1 | 1/1998 |
| WO | 2001032276 | A3 | 2/2002 |
| WO | 2003059472 | A1 | 7/2003 |
| WO | 2002094399 | A8 | 8/2003 |
| WO | 2002027676 | A8 | 9/2003 |
| WO | 2003083796 | A1 | 10/2003 |
| WO | 2004004853 | A2 | 1/2004 |
| WO | 2005020165 | A1 | 3/2005 |
| WO | 2005020166 | A1 | 3/2005 |
| WO | 2005020164 | A3 | 4/2005 |
| WO | 2005030353 | A3 | 4/2005 |
| WO | 2005102480 | A1 | 11/2005 |
| WO | 2006015442 | A1 | 2/2006 |
| WO | 2006031439 | A1 | 3/2006 |
| WO | 2005110563 | A3 | 1/2007 |
| WO | 2007044785 | A3 | 4/2007 |
| WO | 2007050119 | A3 | 7/2007 |
| WO | 2007087297 | A3 | 7/2008 |
| WO | 2007146791 | A3 | 12/2008 |
| WO | 2009006274 | A1 | 1/2009 |
| WO | 2009052300 | A1 | 4/2009 |
| WO | 2009062187 | A1 | 5/2009 |
| WO | 2009086466 | A3 | 7/2009 |
| WO | 2009108805 | A3 | 9/2009 |
| WO | 2010011673 | A1 | 1/2010 |
| WO | 2009135086 | A3 | 2/2010 |
| WO | 2010054061 | A1 | 5/2010 |
| WO | 2010098808 | A1 | 9/2010 |
| WO | 2010137010 | A1 | 12/2010 |
| WO | 2011019949 | A9 | 11/2011 |
| WO | 2012044559 | A1 | 4/2012 |
| WO | 2013059372 | A3 | 4/2013 |
| WO | 2013052453 | A3 | 5/2014 |
| WO | 2014074271 | A1 | 5/2014 |
| WO | 2014210080 | A1 | 12/2014 |
| WO | 2015172060 | A1 | 11/2015 |
| WO | 2015183335 | A8 | 12/2015 |
| WO | 2016014266 | A1 | 1/2016 |
| WO | 2017079706 | A1 | 5/2017 |
| WO | 2017160910 | A1 | 9/2017 |
| WO | 2017160917 | A3 | 12/2017 |
| WO | 2019125422 | A1 | 6/2019 |
| WO | 2019168646 | A1 | 9/2019 |
| ZA | 201500185 | B | 12/2015 |

OTHER PUBLICATIONS

"House of Fun," Sep. 2018 screenshot from web page: "https://www.houseoffun.com/play-now/," 1 page.

Notice of Allowance dated Jun. 17, 2020 for U.S. Appl. No. 29/682,178 (pp. 1-10).

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019) 1 page.

"Figures and Polygons" Sep. 15, 2008, Themathleague, site visited May 27, 2020: https://www.mathleague.com/index.php/ connponent/content/article/3 1-nnathleaguewebsite/genera l/75-figuresandpolygons#octagon (Year: 2018) 2 pages.

"Catherine Wheels, Fireworks, android/ios game" Oct. 24, 2015, YouTube, site visited May 27, 2020: https://www.youtube.com/watch?v=DzCYicyl FJA (Year: 2015) 1 page.

"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018) 1 page.

"Lucky Firecracker slot game [Wild Jackpots]" Jan. 30, 2015, YouTube, site visited May 27, 2020: https://www.youtube.com/watch?v=Gzfe182Qtbc (Year: 2015) 1 page.

Office Action dated May 14, 2020 for U.S. Appl. No. 16/290,836 (pp. 1-5).

Office Action dated Jun. 23, 2020 for U.S. Appl. No. 29/682,179 (pp. 1-11).

"iSoftBet—Scrolls of Ra HD" May 8, 2015, YouTube, site visited Jun. 16, 2020: https://www.youtube.conn/watch?v=9ZciLdlqQNo (Year: 2015) 1 page.

"New Game  Fortune Scroll  Slot Lover" Feb. 11, 2019, YouTube, site visited Jun. 16, 2020: https://www.youtube.conn/watch?v=cdCsvzzRHvs&list=LLMFvEIKJd5VZ1hOwZ7BZDdQ&index=2873 (Year: 2019) 1 page.

"Hot Shot Twin Fire Live Play with many features Bally Slot Machine" Jan. 8, 2017, YouTube, site visited Jun. 16, 2020: https://www.youtube.com/watch?v=b_03gJvQecw (Year: 2017) 1 page.

"Traditional Torah Icon" Feb. 6, 2018, Alamy, site visited Jun. 16, 2020: https://www.alamy.com/ stock-photo-traditional-torah-icon-174149305.htnnl (Year: 2018) 1 page.

"Paper Scroll Clip Art" Dec. 11, 2017, FavPNG, site visited Jun. 16, 2020: https://favpng.com/png_view/ paper-scroll-clip-art-png/DDpwDsEh (Year: 2017) 3 pages.

"Torah Scroll Icon" Jun. 25, 2018, Depositphotos, site visited Jun. 16, 2020: https://depositphotos.com/201375256/stock-illustration-torah-scroll-icon-outline-style.html (Year: 2018) 1 page.

(56) References Cited

OTHER PUBLICATIONS

Office Action dated Jul. 20, 2020 for U.S. Appl. No. 16/290,833 (pp. 1-9).
Notice of Allowance dated Aug. 26, 2020 for U.S. Appl. No. 16/290,836 (pp. 1-8).
Notice of Allowance dated Oct. 7, 2020 for U.S. Appl. No. 29/682,179 (pp. 1-7).
Office Action dated Nov. 12, 2020 for U.S. Appl. No. 16/290,833 (pp. 1-8).
Legato, Frank, "Tourney Time", Global Gaming Business Magazine, Mar. 22, 2019, retrieved from internet on Oct. 7, 2019, https://ggbmagazine.com/article/tourney-time/, 20 pages.
Office Action dated Aug. 18, 2020 for U.S. Appl. No. 29/703,046 (pp. 1-12).
Countdown Timer Background 10 Seconds, by Kanadaka, YouTube [online], published on Dec. 16, 2013, [retrieved on Aug. 13, 2020], retrieved from the Internet <URL: https://www.youtube.com/watch?v=AwOYH3RDUe4> (Year: 2013) 1 page.
3 2 1 Go! Countdown Green Screen, by Da24Gemini, YouTube [online], published on Sep. 15, 2012, [retrieved on Aug. 13, 2020], retrieved from the Internet <URL: https://www.youtube.com/watch?v=WJhxCcx1 M4g> (Year: 2012) 1 page.
Candy Words—Match Word Puzzle Game, by Homer S, YouTube [online], published on Mar. 5, 2019, [retrieved on Aug. 13, 2020], retrieved from the Internet <URL: https://www.youtube.com/watch?v=4TsGNDLrpWk> (Year: 2019) 1 page.
Notice of Allowance dated Jan. 7, 2021 for U.S. Appl. No. 29/703,046 (pp. 1-9).
Office Action dated Jan. 27, 2021 for U.S. Appl. No. 16/290,838 (pp. 1-9).
International Search Report and Written Opinion for App. No. PCT/US19/53398, dated Jan. 6, 2020, 9 pages.
International Search Report and Written Opinion for App. No. PCT/US19/53407, dated Jan. 9, 2020, 8 pages.
Notice of Allowance dated Mar. 15, 2021 for U.S. Appl. No. 16/290,833 (pp. 1-8).
International Preliminary Report on Patentability for App. No. PCT/US2019/053407, dated Apr. 15, 2021, 8 pages.
Office Action dated May 11, 2021 for U.S. Appl. No. 16/946,113 (pp. 1-14).
Notice of Allowance dated May 19, 2021 for U.S. Appl. No. 29/703,046 (pp. 1-8).
Supplemental Notice of Allowability dated Jun. 7, 2021 for U.S. Appl. No. 16/290,833 (pp. 1-2).
Office Action (Final Rejection) dated Aug. 5, 2021 for U.S. Appl. No. 16/290,838 (pp. 1-7).
Corrected Notice of Allowability dated Aug. 18, 2021 for U.S. Appl. No. 29/703,046 (pp. 1-4).
Office Action (Notice of Allowance and Fees Due (PTOL-85)) dated Oct. 21, 2021 for U.S. Appl. No. 16/946,113 (pp. 1-5).
Office Action (Notice of Allowance and Fees Due (PTOL-85)) dated Nov. 9, 2021 for U.S. Appl. No. 16/290,838 (pp. 1-7).
IP.com NPL Search Strategy (Year: 2021).
Office Action (Non-Final Rejection) dated Dec. 27, 2021 for U.S. Appl. No. 17/058,548 (pp. 1-32).
Office Action (Non-Final Rejection) dated Jun. 9, 2022 for U.S. Appl. No. 16/948,846 (pp. 1-7).
Office Action (Notice of Allowance and Fees Due (PTOL-85)) dated Jul. 27, 2022 for U.S. Appl. No. 16/948,846 (pp. 1-7).
Office Action (Non-Final Rejection) dated Mar. 25, 2022 for U.S. Appl. No. 17/304,107 (pp. 1-7).
Office Action (Non-Final Rejection) dated Apr. 1, 2022 for U.S. Appl. No. 17/058,531 (pp. 1-15).
Office Action (Final Rejection) dated Apr. 12, 2022 for U.S. Appl. No. 17/058,548 (pp. 1-18).
Office Action (Non-Final Rejection) dated May 6, 2022 for U.S. Appl. No. 16/948,961 (pp. 1-16).
Office Action (Non-Final Rejection) dated May 24, 2022 for U.S. Appl. No. 16/946,114 (pp. 1-8).
Office Action (Non-Final Rejection) dated Jun. 22, 2022 for U.S. Appl. No. 16/946,116 (pp. 1-16).
Office Action (Notice of Allowance and Fees Due (PTOL-85)) dated Sep. 23, 2022 for U.S. Appl. No. 17/304,107 (pp. 1-7).
Office Action (Final Rejection) dated Jul. 27, 2022 for U.S. Appl. No. 17/304,107 (pp. 1-8).
Office Action (Non-Final Rejection) dated Jul. 21, 2022 for U.S. Appl. No. 16/946,117 (pp. 1-6).
Office Action (Notice of Allowance and Fees Due (PTOL-85)) dated Aug. 8, 2022 for U.S. Appl. No. 17/058,548 (pp. 1-13).
Office Action (Non-Final Rejection) dated May 10, 2023 for U.S. Appl. No. 17/645,701 (pp. 1-5).
Office Action (Non-Final Rejection) dated Jul. 12, 2023 for U.S. Appl. No. 18/051,239 (pp. 1-6).
Office Action (Notice of Allowance and Fees Due (PTOL-85)) dated Aug. 22, 2023 for U.S. Appl. No. 18/051,239 (pp. 1-7).
Office Action (Non-Final Rejection) dated Sep. 28, 2023 for U.S. Appl. No. 17/645,701 (pp. 1-6).
Notice of Allowance dated Apr. 19, 2024 for U.S. Appl. No. 17/645,701 (pp. 1-7).
Office Action (Non-Final Rejection) dated Aug. 15, 2024 for U.S. Appl. No. 17/822,732 (pp. 1-6).
Australian Examination Report No. 1 issued in App. No. AU2020201468, dated Nov. 27, 2024, 3 pages.
Australian Examination Report No. 1 issued in App. No. AU2020201478, dated Dec. 12, 2024, 4 pages.
Office Action (Final Rejection) dated Dec. 4, 2024 for U.S. Appl. No. 17/822,732 (pp. 1-7).

DIGITAL LOBBY AND MULTI-GAME METAMORPHICS

RELATED APPLICATION(S)

The present application is a continuation of U.S. patent application Ser. No. 17/645,701, filed on Dec. 22, 2021 and titled "DIGITAL LOBBY AND MULTI-GAME METAMORPHICS," which is a continuation of U.S. patent application Ser. No. 16/290,838, filed on Mar. 1, 2019 and titled "DIGITAL LOBBY AND MULTI-GAME METAMORPHICS," both of which are hereby incorporated by reference herein in their entireties and for all purposes.

CROSS-REFERENCE TO RELATED APPLICATIONS

This application is related to U.S. patent application Ser. No. 16/290,836, filed on Mar. 1, 2019, and entitled "CONTROLLING AN ELECTRONIC GAMING MACHINE TO PROVIDE A BONUS FEATURE OPPORTUNITY," to U.S. patent application Ser. No. 16/290,833, filed on Mar. 1, 2019 and entitled "INDIVIDUAL METAMORPHIC LINKED JACKPOTS," to U.S. patent application Ser. No. 29/682,178, filed on Mar. 1, 2019 and entitled "DISPLAY SCREEN OR PORTION THEREOF WITH TRANSITIONAL GRAPHICAL USER INTERFACE," and to U.S. patent application Ser. No. 29/682,179, filed on Mar. 1, 2019 and entitled "DISPLAY SCREEN OR PORTION THEREOF WITH TRANSITIONAL GRAPHICAL USER INTERFACE," all of which are hereby incorporated by reference.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

At least some aspects of the present disclosure may be implemented via apparatus. For example, one or more devices may be configured for performing, at least in part, the methods disclosed herein. In some implementations, the apparatus may be a gaming device. The gaming device may include a display system that includes one or more displays, an interface system including one or more user interfaces and a control system that includes one or more processors.

The interface system may include one or more network interfaces, one or more interfaces between the control system and a memory system, one or more interfaces between the control system and another device, one or more external device interfaces and/or one or more user interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

The control system may, for example, be configured for controlling the display system to present a plurality of wagering game images. In some instances, each of the wagering game images may correspond to a different game theme. According to some examples, the control system may be configured for controlling the display system to present a plurality of metamorphic images. In some instances, each metamorphic image of the plurality of metamorphic images may correspond to a wagering game image of the plurality of wagering game images. In some examples, each metamorphic image also may correspond to an award of a game theme corresponding to the wagering game image.

According to some examples, the control system may be configured for receiving, via the interface system, an indication of a selected game theme. In some implementations, the control system may be configured for controlling the display system to present first visual effects corresponding to an instance of the selected game theme. In some examples, the control system may be configured for controlling the display system to present a metamorphic image corresponding to the selected game theme. According to some implementations, receiving the indication of the selected game theme may involve receiving user input data corresponding to a selection of a wagering game image.

According to some implementations, the control system may be configured for receiving, via the interface system, indications of first through Nth selected game themes. In some examples, the control system may be configured for controlling the display system to present first through Nth visual effects corresponding to an instance of each of the first through Nth selected game themes and to present a metamorphic image corresponding to each of the first through Nth selected game themes. In some such examples, the control system may be configured for controlling the display system to present the first through Nth visual effects and the metamorphic images on a single display.

In some examples, the control system may be configured for controlling the display system to present the first visual effects and a first metamorphic image in a first area of the single display. In some such examples, the control system may be configured for controlling the display system to present the Nth visual effects and an Nth metamorphic image in an Nth area of the single display.

According to some implementations, the control system may be configured for receiving (e.g., from a server) metamorphic image data that indicates how a display of a metamorphic image should be updated. In some such examples, the control system may be configured for controlling the display system to update a display of the metamorphic image according to the metamorphic image data.

In some examples, at least one metamorphic image may correspond to a probability of a corresponding award being granted. However, in other examples, a metamorphic image may not correspond to a probability of a corresponding award being granted.

According to some implementations, at least one award may be a credit award. In some examples, at least one award may be a progressive jackpot award. According to some examples, at least one award may be a feature award. The feature award may, for example, include an award of one or more bonus games. In some such examples, a metamorphic image corresponding to the feature award may indicate an accumulation of feature award credits towards an automatic feature award. In some such examples, the first visual effects include game play items that correspond to the feature award credits.

According to some examples, the metamorphic image may correspond to a number of game events that have occurred since the award has been granted. A game event may, for example, involve a particular symbol landing during an instance of a game, a particular combination of symbols landing during an instance of a game, etc. Game events may, for example, involve occurrences of slot reel symbols, card image symbols, and/or combinations of slot reel symbols or card image symbols. In some examples, a game event may involve the initiation of a process for obtaining a randomly-determined outcome that is triggered by an occurrence of a symbol or of a combination of symbols. In some examples, the game events may involve occurrences of a wild symbol.

According to some implementations, the gaming device may be an electronic gaming machine or a mobile gaming device configured for deployment in a casino. However, in some examples the gaming device may be an end user device that may be configured for online gaming.

At least some aspects of the present disclosure may be implemented via methods. For example, some methods may involve controlling, via a control system of a gaming device that includes one or more processors, a display system of the gaming device to present a plurality of wagering game images. Each of the wagering game images may, for example, correspond to a different game theme.

Some such methods may involve controlling the display system to present a plurality of metamorphic images. Each metamorphic image of the plurality of metamorphic images may correspond to a wagering game image of the plurality of wagering game images. In some instances, each metamorphic image also may correspond to an award of a game theme corresponding to the wagering game image.

Some such methods may involve receiving, via an interface system of the gaming device, an indication of a selected game theme. Such methods may involve controlling the display system to present first visual effects corresponding to an instance of the selected game theme and to present a metamorphic image corresponding to the selected game theme. In some examples, receiving the indication of the selected game theme may involve receiving user input data corresponding to a selection of a wagering game image.

Some methods may involve receiving (e.g., from a server) metamorphic image data that indicates how a display of a metamorphic image should be updated. Some such methods may involve controlling the display system to update a display of the metamorphic image according to the metamorphic image data.

Some methods may involve receiving, via the interface system, indications of first through Nth selected game themes. Such methods may involve controlling the display system to present first through Nth visual effects corresponding to an instance of each of the first through Nth selected game themes and to present a metamorphic image corresponding to each of the first through Nth selected game themes.

Some methods may involve controlling the display system to present the first visual effects and a first metamorphic image in a first area of a single display. Some such methods may involve controlling the display system to present the Nth visual effects and an Nth metamorphic image in an Nth area of the single display.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as those disclosed herein. The software may, for example, include instructions for performing one or more of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

DETAILED DESCRIPTION

Figure 1:
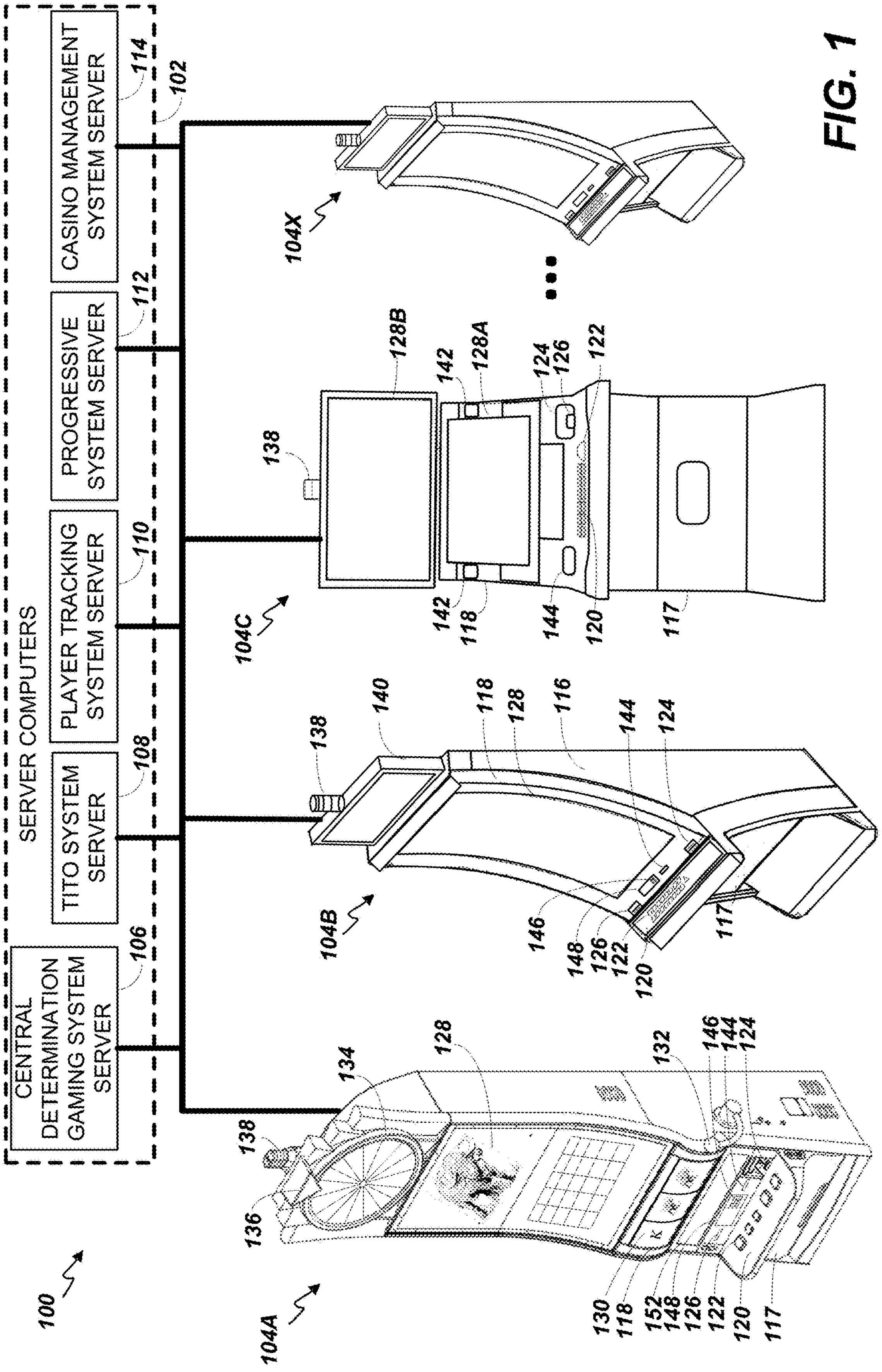
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices. Some examples are described below.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 may include a central determination gaming system server 106, a Class II bingo server (not shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to present or determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor. The main display 128 may be a touchscreen display.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
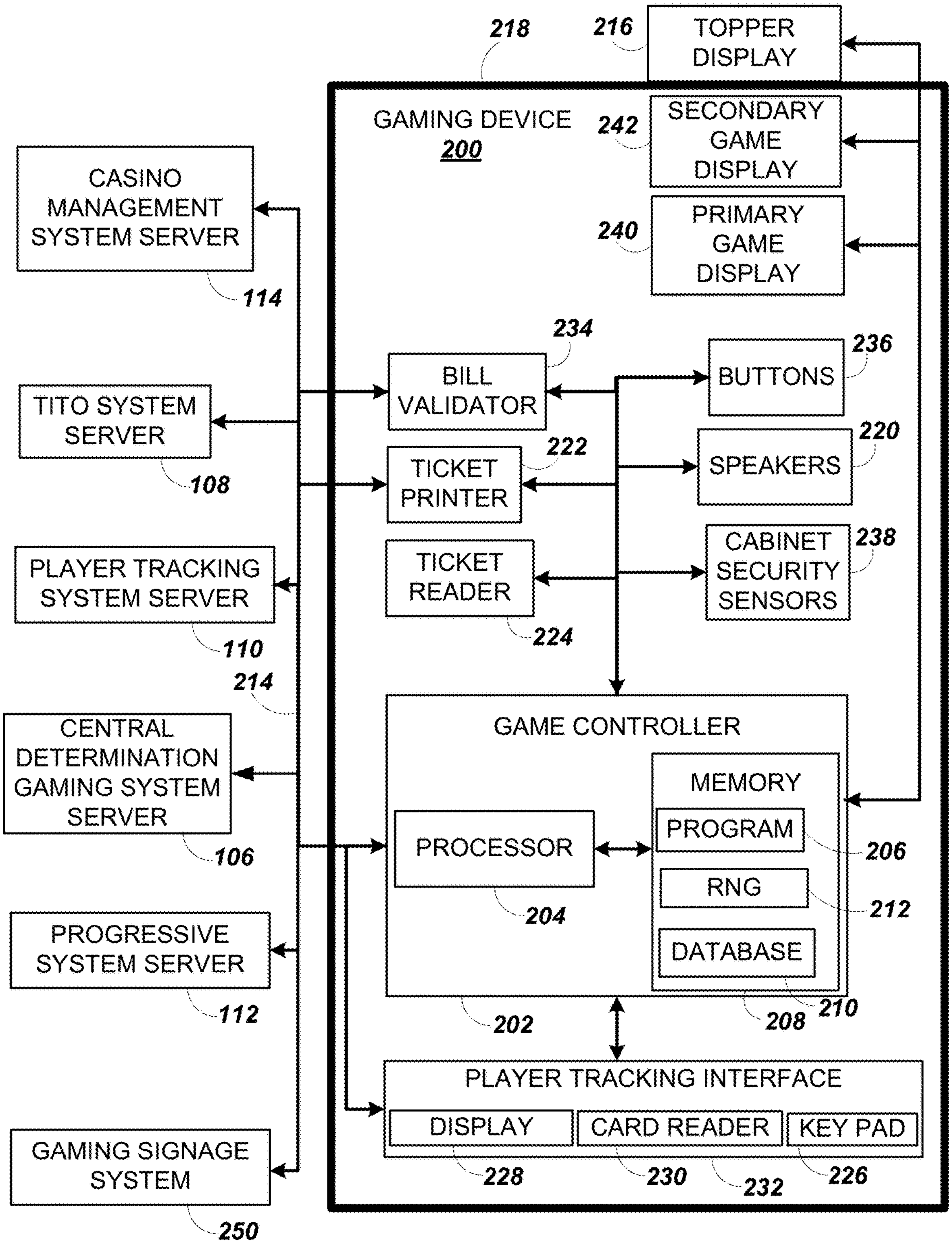
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server 106. The game instance may be communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash out button to receive a ticket from the ticket printer 222). The ticket may be redeemed for money or inserted into another machine to establish a credit balance for play.

Figure 3:
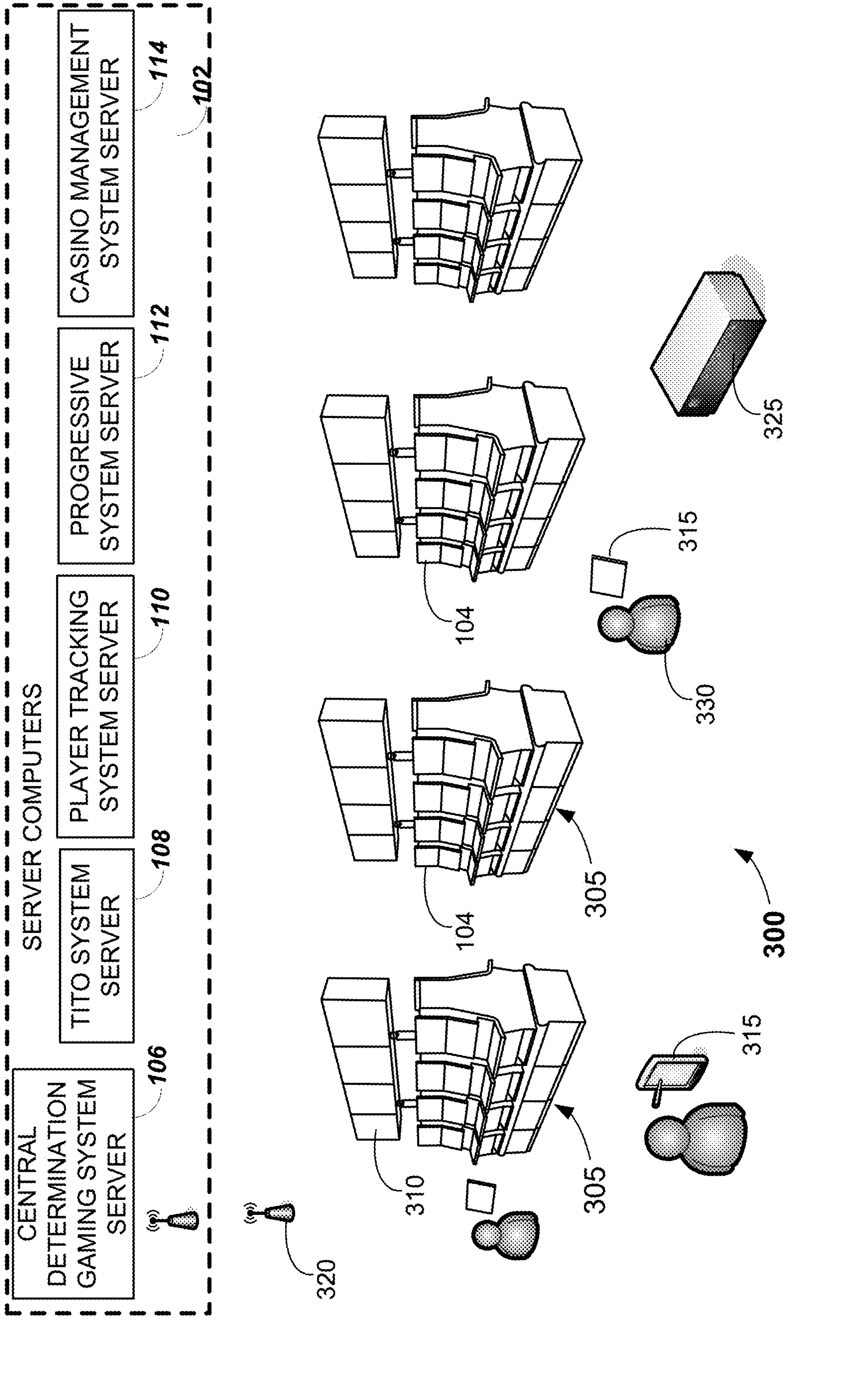
FIG. 3 depicts a casino gaming environment according to one example.

FIG. 3 depicts a casino gaming environment according to one example. In this example, the casino 300 includes banks 305 of EGMs 104. In this example, each bank 305 of EGMs 104 includes a corresponding gaming signage system 310. According to this implementation, the casino 300 also includes mobile gaming devices 315, which are also configured to present wagering games in this example. The mobile gaming devices 315 may, for example, include tablet devices, cellular phones, smart phones and/or other handheld devices. In this example, the mobile gaming devices 315 are configured for communication with one or more other devices in the casino 300, including but not limited to one or more of the server computers 102, via wireless access points 320.

According to some examples, the mobile gaming devices 315 may be configured for stand-alone determination of game outcomes. However, in some alternative implementations the mobile gaming devices 315 may be configured to receive game outcomes from another device, such as the central determination gaming system server 106, one of the EGMs 104, etc.

Some mobile gaming devices 315 may be configured to accept monetary credits from a credit or debit card, via a wireless interface (e.g., via a wireless payment app), via tickets, via a patron casino account, etc. However, some mobile gaming devices 315 may not be configured to accept monetary credits via a credit or debit card. Some mobile gaming devices 315 may include a ticket reader and/or a ticket printer whereas some mobile gaming devices 315 may not, depending on the particular implementation.

In some implementations, the casino 300 may include one or more kiosks 325 that are configured to facilitate monetary transactions involving the mobile gaming devices 315, which may include cash out and/or cash in transactions. The kiosks 325 may be configured for wired and/or wireless communication with the mobile gaming devices 315. The kiosks 325 may be configured to accept monetary credits from casino patrons 330 and/or to dispense monetary credits to casino patrons 330 via cash, a credit or debit card, via a wireless interface (e.g., via a wireless payment app), via tickets, etc. According to some examples, the kiosks 325 may be configured to accept monetary credits from a casino patron and to provide a corresponding amount of monetary credits to a mobile gaming device 315 for wagering purposes, e.g., via a wireless link such as a near-field communications link. In some such examples, when a casino patron 330 is ready to cash out, the casino patron 330 may select a cash out option provided by a mobile gaming device 315, which may include a real button or a virtual button (e.g., a button provided via a graphical user interface) in some instances. In some such examples, the mobile gaming device 315 may send a "cash out" signal to a kiosk 325 via a wireless link in response to receiving a "cash out" indication from a casino patron. The kiosk 325 may provide monetary credits to the patron 330 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 315 and/or a kiosk 325.

Some mobile gaming devices 315 may be configured for receiving and/or transmitting player loyalty information. For example, some mobile gaming devices 315 may be configured for wireless communication with the player tracking system server 110. Some mobile gaming devices 315 may be configured for receiving and/or transmitting player loyalty information via wireless communication with a patron's player loyalty card, a patron's smartphone, etc.

According to some implementations, a mobile gaming device 315 may be configured to provide safeguards that prevent the mobile gaming device 315 from being used by an unauthorized person. For example, some mobile gaming devices 315 may include one or more biometric sensors and may be configured to receive input via the biometric sensor(s) to verify the identity of an authorized patron. Some mobile gaming devices 315 may be configured to function only within a predetermined or configurable area, such as a casino gaming area.

Figure 4:
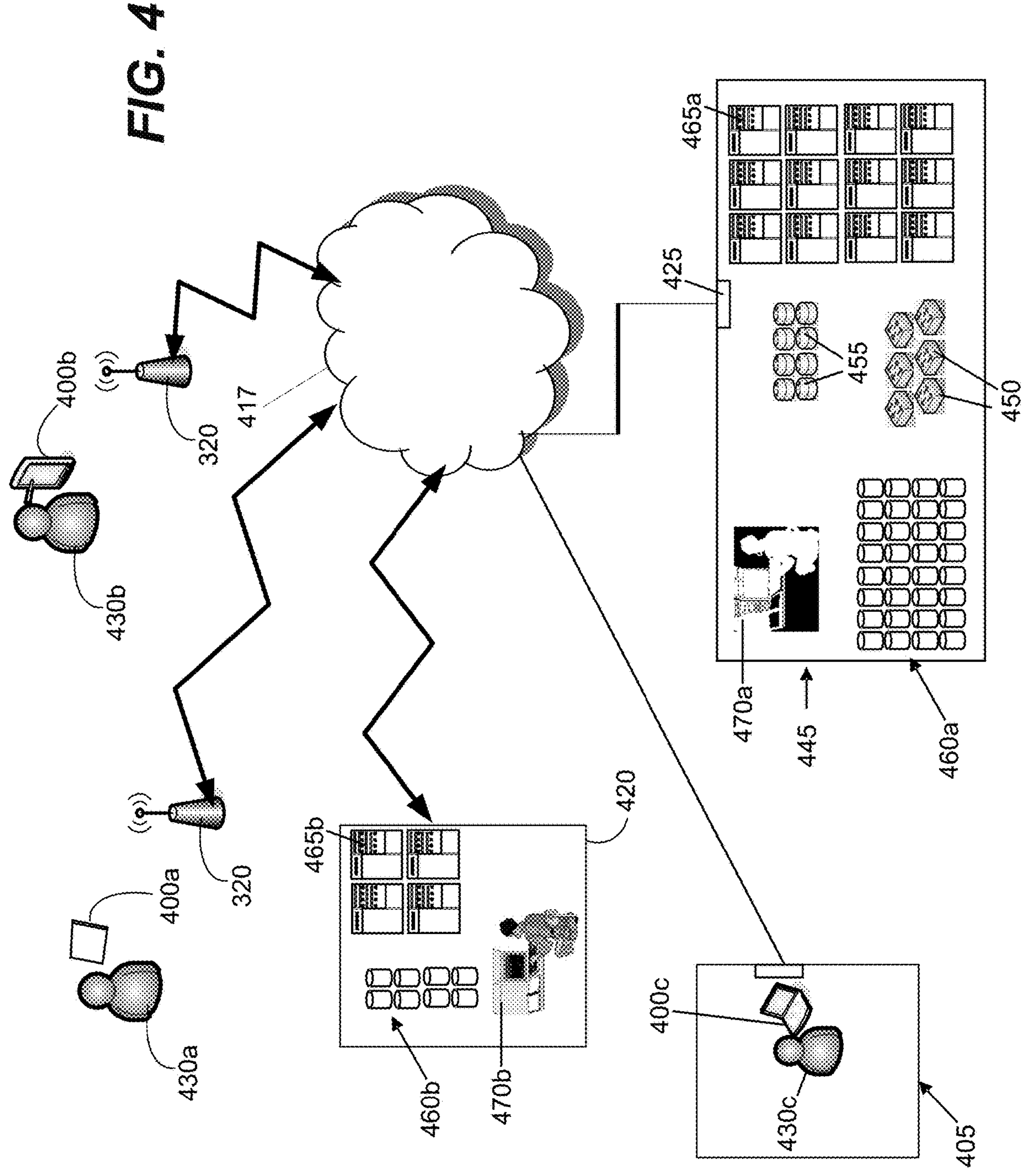
FIG. 4 is a diagram that shows examples of components of a system for providing online gaming according to some aspects of the present disclosure.

FIG. 4 is a diagram that shows examples of components of a system for providing online gaming according to some aspects of the present disclosure. As with other figures presented in this disclosure, the numbers, types and arrangements of gaming devices shown in FIG. 4 are merely shown by way of example. In this example, various gaming devices, including but not limited to end user devices (EUDs) 400*a*, 400*b* and 400*c* are capable of communication via one or more networks 417. The networks 417 may, for example, include one or more cellular telephone networks, the Internet, etc. In this example, the EUDs 400*a* and 400*b* are mobile devices: according to this example the EUD 400*a* is a tablet device and the EUD 400*b* is a smart phone. In this implementation, the EUD 400*c* is a laptop computer that is located within a residence 405 at the time depicted in FIG. 4. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 445 includes various devices that are configured to provide online wagering games via the networks 417. The gaming data center 445 is capable of communication with the networks 417 via the gateway 425. In this example, switches 450 and routers 455 are configured to provide network connectivity for devices of the gaming data center 445, including storage devices 460*a*, servers 465*a* and one or more workstations 570*a*. The servers 465*a* may, for example, be configured to provide access to a library of games for online game play. In some examples, code for executing at least some of the games may initially be stored on one or more of the storage devices 460*a*. The code may be subsequently loaded onto a server 465*a* after selection by a player via an EUD and communication of that selection from the EUD via the networks 417. The server 465*a* onto which code for the selected game has been loaded may provide the game according to selections made by a player and indicated via the player's EUD. In other examples, code for executing at least some of the games may initially be stored on one or more of the servers 465*a*. Although only one gaming data center 445 is shown in FIG. 4, some implementations may include multiple gaming data centers 445.

In this example, a financial institution data center 420 is also configured for communication via the networks 417. Here, the financial institution data center 420 includes servers 465*b*, storage devices 460*b*, and one or more workstations 470*b*. According to this example, the financial institution data center 420 is configured to maintain financial accounts, such as checking accounts, savings accounts, loan accounts, etc. In some implementations one or more of the authorized users 430*a*-430*c* may maintain at least one financial account with the financial institution that is serviced via the financial institution data center 420.

According to some implementations, the gaming data center 445 may be configured to provide online wagering games in which money may be won or lost. According to some such implementations, one or more of the servers 465*a* may be configured to monitor player credit balances, which may be expressed in game credits, in currency units, or in any other appropriate manner. In some implementations, the server(s) 465*a* may be configured to obtain financial credits from and/or provide financial credits to one or more financial institutions, according to a player's "cash in" selections, wagering game results and a player's "cash out" instructions. According to some such implementations, the server(s) 465*a* may be configured to electronically credit or debit the account of a player that is maintained by a financial institution, e.g., an account that is maintained via the financial institution data center 420. The server(s) 465*a* may, in some examples, be configured to maintain an audit record of such transactions.

In some alternative implementations, the gaming data center 445 may be configured to provide online wagering games for which credits may not be exchanged for cash or the equivalent. In some such examples, players may purchase game credits for online game play, but may not "cash out" for monetary credit after a gaming session. Moreover, although the financial institution data center 420 and the gaming data center 445 include their own servers and storage devices in this example, in some examples the financial institution data center 420 and/or the gaming data center 445 may use offsite "cloud-based" servers and/or storage devices. In some alternative examples, the financial institution data center 420 and/or the gaming data center 445 may rely entirely on cloud-based servers.

One or more types of devices in the gaming data center 445 (or elsewhere) may be capable of executing middleware, e.g., for data management and/or device communication. Authentication information, player tracking information, etc., including but not limited to information obtained by EUDs 400 and/or other information regarding authorized users of EUDs 400 (including but not limited to the authorized users 430*a*-430*c*), may be stored on storage devices 460 and/or servers 465. Other game-related information and/or software, such as information and/or software relating to leaderboards, players currently playing a game, game themes, game-related promotions, game competitions, etc., also may be stored on storage devices 460 and/or servers 465. In some implementations, some such game-related software may be available as "apps" and may be downloadable (e.g., from the gaming data center 445) by authorized users.

In some examples, authorized users and/or entities (such as representatives of gaming regulatory authorities) may obtain gaming-related information via the gaming data center 445. One or more other devices (such EUDs 400 or devices of the gaming data center 445) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Some games involve what is sometimes referred to as a "metamorphic," a "game metamorphic," a "metamorphic image," a "metamorphic meter," etc., which change or metamorphose over time in response to gaming events. In some wagering game examples, a metamorphic image may change in response to the increasing value of a progressive. In some such examples, a metamorphic image may change in response to the increasing value indicated on a progressive meter. For example, a metamorphic image may increase in size in accordance with an increasingly larger value indicated on a progressive meter. Alternatively, or additionally, a metamorphic image may change color in accordance with an increasingly larger value indicated on a progressive meter. For example, the metamorphic image may change from a relatively "cooler" color (such as green or blue) to a relatively "hotter" color (such as yellow, orange or red) in accordance with an increasingly larger value indicated on a progressive meter.

Players like some aspects of existing wagering games that involve metamorphic images. For example, changes in the metamorphic image may enhance player excitement, because the increasing value of a progressive may be indicated not merely by a larger number, but also by a changing image to which the player may respond in a relatively more intuitive manner. Accordingly, existing wagering games that involve one or more metamorphic images can provide benefits both to players and to casinos.

However, some players find other aspects of existing wagering games that involve metamorphic images to be less than optimal. For example, some existing wagering games that involve metamorphic images require a player to play a game (or view the game while another player is playing it) before the player is able to view any metamorphic images that may be associated with the game.

Particular aspects of the subject matter described in this disclosure can be implemented to realize one or more of the following potential advantages. In some implementations, the player may be able to select a game theme from a plurality of displayed game themes. The game themes may be presented via images, examples of which may be referred to as "wagering game images" herein, on a display system of a gaming device.

In some implementations, an associated metamorphic image may be displayed with at least some of the wagering game images. The metamorphic image may be associated with an award of a game theme corresponding to the wagering game image. The state of the metamorphic image(s) may or may not correspond to the probability of an award being granted, depending on the particular implementation.

For some game themes, the state of the metamorphic image may actually correspond to the probability of an award being granted. A player may be motivated to learn more about various proffered wagering games, at least in part to know which game themes involve a metamorphic image that actually corresponds to the probability of an award being granted. Accordingly, such implementations may increase player participation in, and engagement with, various proffered wagering games.

However, even if the state of a metamorphic image does not actually correspond to the probability of an award being granted, the state of the metamorphic image may nonetheless appear to correspond to the probability of an award being granted. In some instances, the state of the metamorphic image(s) may appear to correspond to the duration of time since an award has been granted. Depending on the state of a metamorphic image, a player may believe that a corresponding award is relatively more or relatively less likely to be granted.

Accordingly, whether or not the state of a metamorphic image corresponds to the probability of an award being granted, a player's selection of a game theme may be influenced by the state of an associated metamorphic image. The player may feel an increased sense of control and/or an increased sense of personal investment in a selected game theme. Showing the state of an associated metamorphic image along with a wagering game image would be a benefit for players who "shop" for jackpots and/or features. Such a display would allow such players to see at a glance the metamorphic state(s) for a particular game. Some implementations may retain a player's metamorphic progress and/or show the current metamorphic progress for all players playing the game. According to some such examples, when a player returns to the game the player will be reminded of the player's own progress and/or will be updated on the progress made by other players. Such implementations may enhance player excitement and/or player satisfaction.

Figure 5:
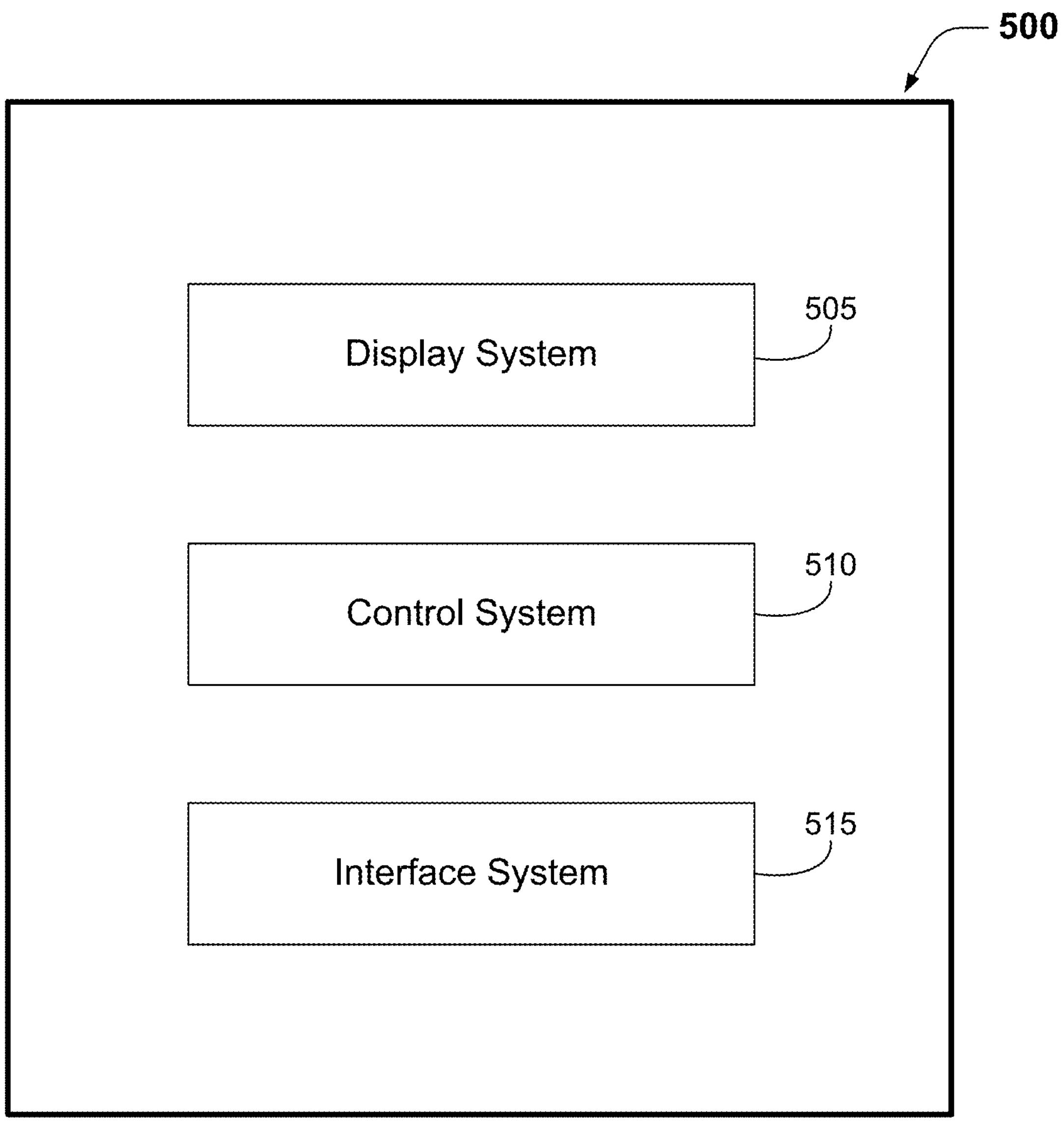
FIG. 5 is a block diagram that shows blocks of an apparatus according to one example.

FIG. 5 is a block diagram that shows blocks of an apparatus according to one example. According to some examples, the apparatus 500 may be, or may include, a gaming device. In some examples, the apparatus 500 may be an EGM such as those described above with reference to FIGS. 1 and 2. However, in alternative examples, the apparatus 500 may be a mobile device such as described above with reference to FIG. 3 or an EUD as described above with reference to FIG. 4. In this example, the apparatus 500 includes a display system 505 and a control system 510 that is configured to communicate with the display system 505. In this example, the control system 510 is configured to communicate with the display system 505 via wired communication, e.g., via electrical signals. In alternative implementations, the control system 510 may be configured to communicate with the display system 505 via wireless communication. Accordingly, at least a portion of the control system 510 may be coupled to the display system 505. As used herein, the term "coupled to" has a meaning that could include being physically coupled for wired communication or being configured for wireless communication.

The control system 510 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 515 is shown as being separate from the control system 510, in some implementations the interface system 515 may be part of the control system 510. In some implementations, the interface system 515 may include the entire control system 510. The control system 510 also may include (and/or be configured for communication with) one or more memory devices, such as one or more random access memory (RAM) devices, read-only memory (ROM) devices and/or other types of non-transitory media. In some implementations, at least a portion of the control system 510 may be implemented as a register. Accordingly, the apparatus 500 may have a memory system that includes one or more memory devices, though the memory system is not shown in FIG. 5.

The control system 510 may be capable of performing, at least in part, the methods disclosed herein. In some examples, the control system 510 may be capable of performing at least some of the methods described herein according to instructions (e.g., software) stored on non-transitory media. For example, the control system 510 may be configured for controlling the display system 505 and/or for receiving and processing data from at least a portion of the display system 505, e.g., as described below.

The display system 505 may include, one or more liquid crystal displays (LCDs), plasma displays, light-emitting diode (LED) displays, microLED displays or organic light-emitting diode (OLED) displays. According to some implementations, the display system 505 may include at least one flexible display, such as a flexible OLED. Although shown as separate components in FIG. 5, the display system 505 may, in some examples, include at least a portion of the control system 510. For example, the display system 505 may include one or more processors, microprocessors, programmable logic devices, discrete gates or transistor logic, etc.

In the example shown in FIG. 5, the apparatus 500 includes an interface system 515. In some examples, the interface system may include a wireless interface system. In some implementations, the interface system 515 may include a network interface, an interface between the control system 510 and the display system 505, an interface between the control system 510 and a memory system and/or an interface between the control system 510 and an external device interface (e.g., a port or an applications processor). In some examples, the interface system 515 may include one or more user interfaces, such as a touch screen, one or more buttons, a gesture recognition system, a voice recognition system, etc.

According to some implementations, the apparatus 500 may be a single device, whereas in other implementations the apparatus 500 may be a system that includes more than one device. Accordingly, the terms "apparatus" and "system" may sometimes be used interchangeably herein. In other examples, the apparatus 500 may be a component of another device. For example, in some implementations at least a portion of the display system 505 and/or the control system 510 may be included in more than one apparatus. For example, in some implementations at least part of the control system 510 may reside in a server, such as a central determination server, a server that tracks feature award credits, etc.

Figure 6:
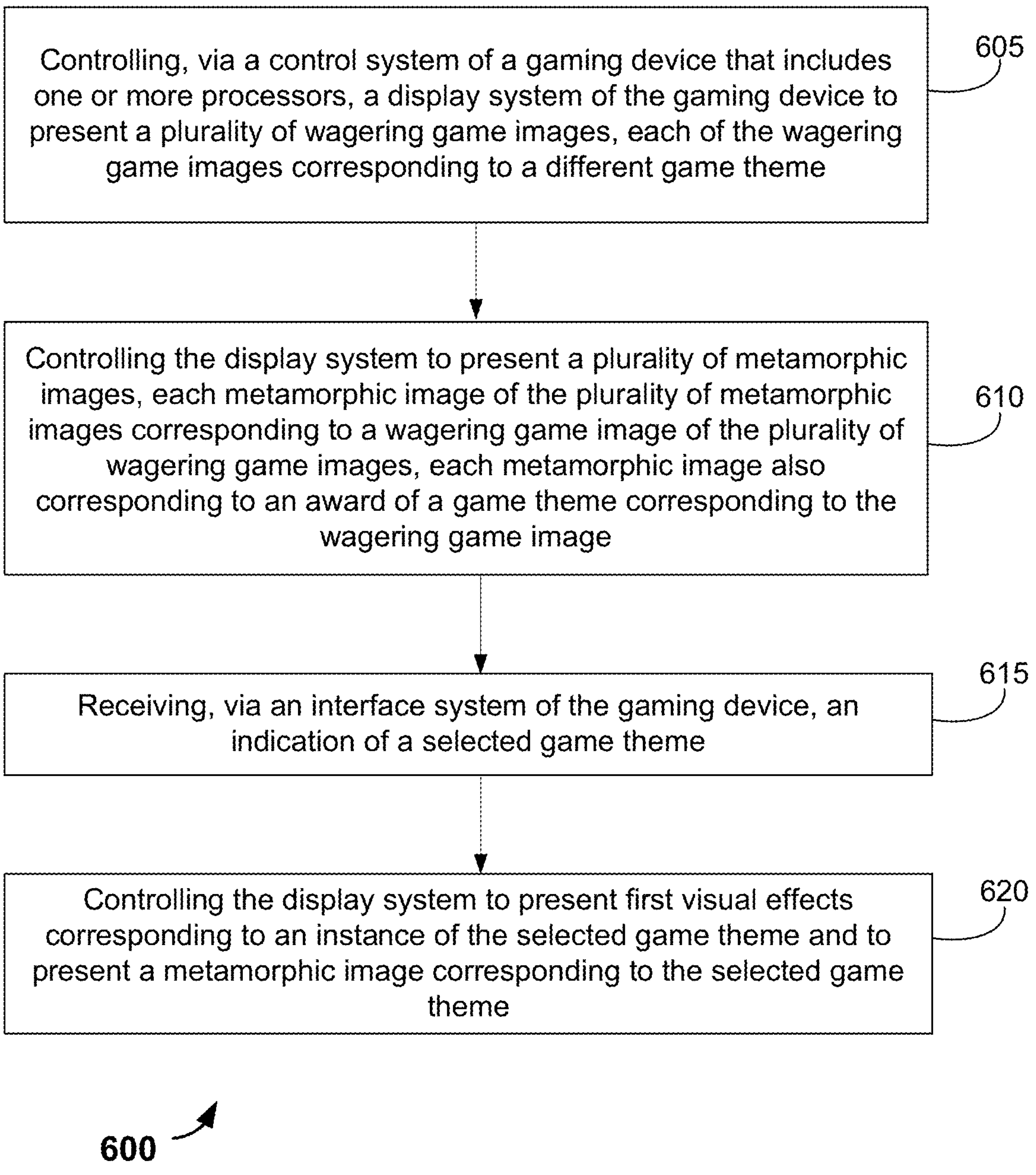
FIG. 6 is a flow diagram that shows blocks of a method according to one example.

FIG. 6 is a flow diagram that shows blocks of a method according to one example. In some examples method 600 may be performed, at least in part, by an apparatus such as that described above with reference to FIG. 5. In some examples, the method 600 may be performed by a control system (e.g., the control system 510 of FIG. 5) according to software stored upon one or more non-transitory storage media. As with other methods described herein, the number and sequence of blocks shown in FIG. 6 are merely examples. Similar disclosed methods may include more or fewer blocks. Moreover, at least some of the blocks may occur in a different sequence than the sequence that is shown in a flow diagram. For example, in some implementation the operations of blocks 605 and 610 may occur simultaneously.

According to this example, block 605 involves controlling, via a control system of an electronic gaming machine that includes one or more processors, a display system of the gaming device to present a plurality of wagering game images. In this example, each of the wagering game images corresponds to a different game theme. Some examples are described below with reference to FIGS. 7-11 and 16-19A. According to some such implementations, the wagering game images may be presented on a display system of an EGM that is configured for deployment in a casino. For example, a player may be able to select one or more game themes for presentation of wagering games on the EGM by interacting with a graphical user interface (GUI) that includes the wagering game images.

In alternative implementations, the wagering game images may be presented on a display system of another type of gaming device, such as one of the types of end user devices (EUDs) that are described above with reference to FIG. 4. At least some such EUDs may be configured for online gaming, e.g., after downloading a software application or "app" that facilitates online gaming. According to some such implementations, the wagering game images may be presented in a "digital lobby" of available wagering games for online play, such as the "Main Lobby" of the Heart of Vegas™ website that is provided by Aristocrat. Such websites may, in some examples, be hosted via one or more devices (e.g., one or more servers) of a gaming data center, which in some examples may be similar to the gaming data center 445 that is described above with reference to FIG. 4. The gaming data center(s) may provide, e.g., via one or more servers, one or more apps for online gaming. In some examples, a player may be able to select one or more game themes for presentation of wagering games on the EUD by interacting with a graphical user interface (GUI) that includes the wagering game images. The EUD may, for example, communicate with a server of a gaming data center and may receive information from the server for presenting and/or updating a display of the EUD to present images corresponding to the one or more game themes.

In this example, block 610 involves controlling the display system to present a plurality of metamorphic images. According to this implementation, each metamorphic image corresponds to a wagering game image of the plurality of wagering game images.

Here, each metamorphic image also corresponds to an award of a game theme corresponding to the wagering game image. For example, the metamorphic image may correspond to a credit award (such as a progressive jackpot award) of a game theme corresponding to the wagering game image. According to some examples, at least one metamorphic image may correspond to a probability of a corresponding award being granted.

As used herein, the "state" of a metamorphic image includes visual characteristics of the metamorphic image at a particular time. As the metamorphic image changes, its state changes. The state changes depend on the particular type of metamorphic image and the particular implementation. For example, if the metamorphic image includes a string of firecrackers, the state of the metamorphic image may be indicated, at least in part, by how many firecrackers in the string of firecrackers currently have lit fuses. If changes to the metamorphic image include a change in size and/or shape of the metamorphic image, the state of the metamorphic image may correspond, at least in part, to the current size and/or shape of the metamorphic image. The EUD may, for example receive information from a server for presenting and/or updating a display of the EUD to present images corresponding to one or more metamorphic images and/or the states of the one or more metamorphic images. Some examples are provided herein.

In the example shown in FIG. 6, block 615 involves receiving, via an interface system of the gaming device, an indication of a selected game theme. For example, block 615 may involve receiving an indication of a touch in an area of a touch screen that corresponds with a wagering game image that corresponds to the selected game theme. According to some implementations, block 615 may involve receiving an indication of the selected game theme via input from a mouse, a trackball, a physical or virtual button, etc. In some implementations, block 615 may involve receiving an indication of the selected game theme according to a voice command, via input from a microphone. Accordingly, block 615 may involve receiving some form of user input data corresponding to a selection of a wagering game image.

According to this example, block 620 involves controlling the display system to present first visual effects corresponding to an instance of the selected game theme. In this example, block 620 also involves controlling the display system to present at least one metamorphic image corresponding to the selected game theme.

Depending on the particular implementation, the state of a metamorphic image that is presented in block 610 may or may not correspond to a probability of an award being granted. For some game themes, the state of the metamorphic image may actually correspond to the probability of an award being granted. A player may be motivated to learn more about various available wagering games, at least in part to know which game themes involve a metamorphic image that actually corresponds to the probability of an award being granted. Accordingly, such implementations may increase player participation in, and engagement with, various wagering games.

However, even if the state of a metamorphic image does not actually correspond to the probability of an award being granted, the state of the metamorphic image may still appear to correspond to the probability of an award being granted. For example, the state of the metamorphic image(s) may correspond to a number of game events that have occurred since the award has been granted. A game event may, for example, involve a particular symbol landing during an instance of a game, a particular combination of symbols landing during an instance of a game, etc. Game events may, for example, involve occurrences of slot reel symbols, card image symbols, and/or combinations of slot reel symbols or card image symbols. In some examples, a game event may involve the initiation of a process for obtaining a randomly-determined outcome that is triggered by an occurrence of a symbol or of a combination of symbols. In some examples, the game events may involve occurrences of a wild symbol. In some such examples, the state of the metamorphic image(s) may appear to correspond to the duration of time since an award has been granted. Depending on the state of a metamorphic image, a player may believe that a corresponding award is relatively more or relatively less likely to be granted.

Accordingly, whether or not the state of a metamorphic image actually corresponds to the probability of an award being granted, the state of the metamorphic image may influence a player's selection of a game theme and accordingly may affect the indication that is received in block 615 of FIG. 6.

What may be referred to herein as "collection-based" games are popular with some players. Some collection-based games may be wagering games. Collection-based games generally involve accumulating one or more types of game play items, such as one or more types of symbols, while playing a game in order to trigger a "feature." The feature may include a bonus game or a bonus round. The game may be base game or a bonus game. In general, a player may need to play many instances of a base game in order to accumulate enough game play items to trigger an automatic award of the feature. For example, a player may need to accumulate a predetermined number of scatter symbols (e.g., 6 scatter symbols) to trigger an automatic award of the feature.

In some implementations, a player may be able to accumulate "feature award credits" by collecting game play items during play of a game, such as a selected game theme that is presented in block 620. In some examples, one or more of the metamorphic images that are presented in block 610 may correspond to a feature award of one or more bonus games. According to some such examples, a metamorphic image corresponding to the feature award may indicate an accumulation of feature award credits towards an automatic feature award. The feature award credits may correspond to game play items, such as collectible game play items, of a particular game theme.

Accordingly, if the state of a metamorphic image indicates a significant accumulation of feature award credits towards an automatic feature award, the state of the metamorphic image may influence a player's selection of a game theme. If, for example, the state of metamorphic image A indicates a greater accumulation of feature award credits towards an automatic feature award than the state of metamorphic image B, a player may be more likely to select a game theme that corresponds to metamorphic image A.

Figure 7:
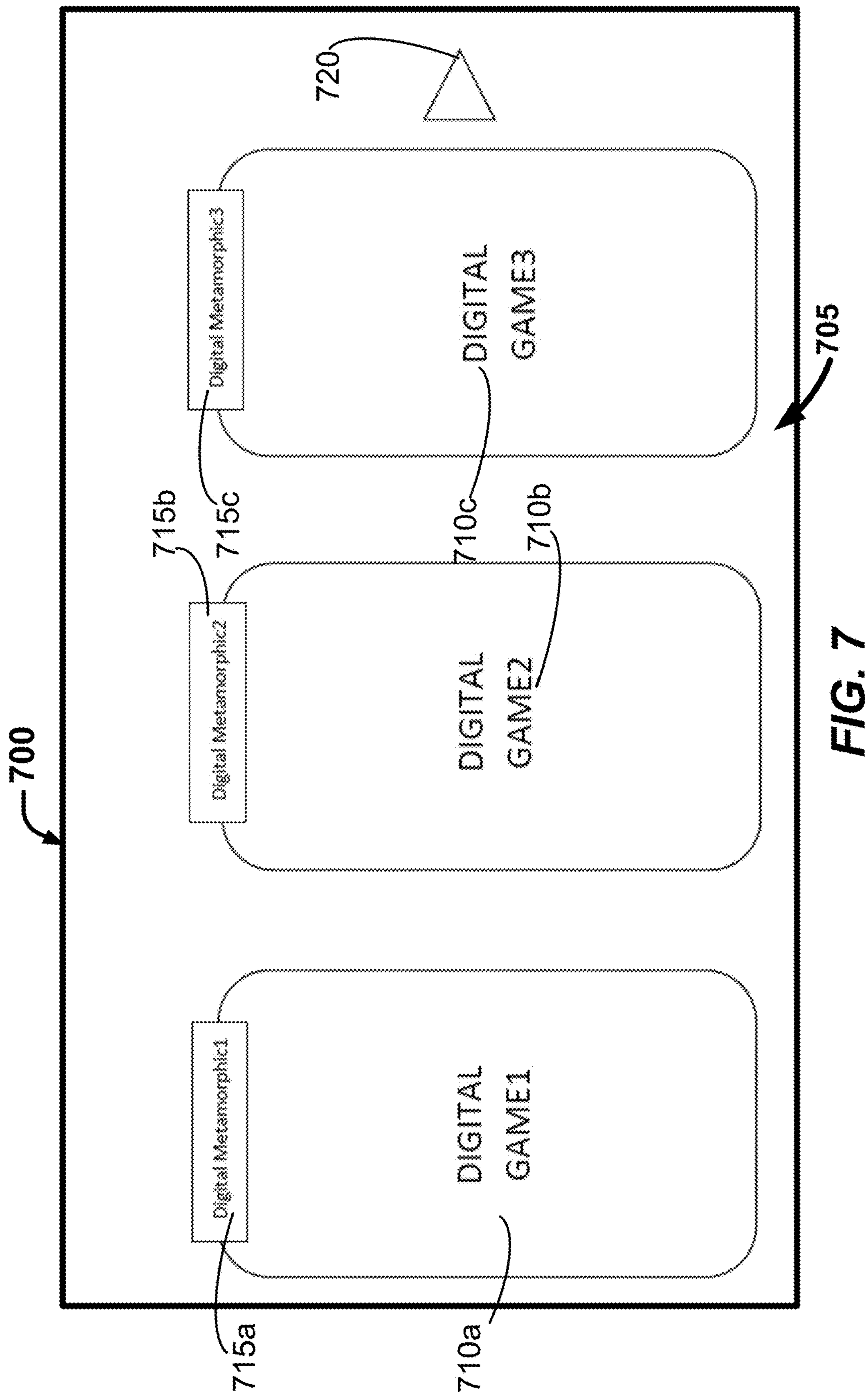
FIG. 7 shows an example of wagering game images and corresponding metamorphic images being displayed on a gaming device.

FIG. 7 shows an example of wagering game images and corresponding metamorphic images being displayed on a gaming device. In the example shown in FIG. 7, the wagering game images and corresponding metamorphic images are being displayed on a display system 705 of a gaming device 700. The gaming device 700 is an example of the apparatus 500 that is described above with reference to FIG. 5. In some examples, the gaming device 700 may be, or may include, an end user device such as those described above with reference to FIG. 4. According to some such examples, the gaming device 700 may be, or may include, a mobile device (such as a cell phone or a tablet), a laptop computer, etc. However, in alternative examples the gaming device 700 may be, or may include, an EGM or another type of dedicated gaming device. In this implementation, the display system 705 is one example of the display system 505 that is described above with reference to FIG. 5.

In this example, a control system of gaming device 700 is configured for controlling the display system 705 to present a plurality of wagering game images, each of the wagering game images corresponding to a different game theme. According to this example, the control system is configured for controlling the display system 705 to present a metamorphic image corresponding to each of the game themes. However, in some alternative implementations each of the wagering game images may not have a corresponding metamorphic image. In some examples, one or more wagering game images may have more than one corresponding metamorphic image. Various examples are provided herein, some of which are described below.

In some examples, the type of presentation shown in FIG. 7 may correspond to a "digital lobby" for selection of a wagering game theme for online gaming. Such a digital lobby may be presented by a gaming entity via one or more servers, etc., of a data center such as that described above with reference to FIG. 4. According to some such examples, the gaming device 700 may be configured to execute a web browser for accessing the digital lobby. However, in alternative examples the type of presentation shown in FIG. 7 may be made on a display system of an EGM or another type of dedicating gaming device. According to some implementations user may, for example, select Digital Game 1, Digital Game 2 or Digital Game 3 by providing user input to the gaming device 700, e.g., by touching an area of a touch screen in a corresponding portion of the display system 705. In this example, a user may view additional wagering game images by interacting with the pointer image 720, e.g., via a curser and mouse click, by touching an area of a touch screen in a corresponding portion of the display system 705, etc.

According to this example, the control system is configured for controlling the display system 705 to present first through Nth wagering game images and first through Nth corresponding metamorphic images on a single display. In this example, N equals 3. However, in other examples N may be an integer that is greater than 3 or an integer that is less than 3.

According to this implementation, the control system is configured for controlling the display system 705 to present the wagering game image **710*a* and the corresponding metamorphic image 715*a* in a first area of the display, to present the wagering game image 710*b* and the corresponding metamorphic image 715*b* in a second area of the display, and to present the wagering game image 710*c* and the corresponding metamorphic image 715*c* in a third area of the display. In alternative examples, the control system may be configured for controlling the display system to present one or more of the wagering game images and/or one or more of the metamorphic images in a different area of the display system 705**, e.g., in a diagonal arrangement, in a column, etc.

In the examples shown in FIG. 7, the metamorphic images **715*a*-715*c* are shown as identical blocks, but this is merely intended to indicate that any type or state of metamorphic image could be presented where the blocks are drawn, or in another area of the display. However, it will be appreciated that a user's selection of a wagering game for play may be influenced by the state of a corresponding metamorphic image. Therefore, various examples of metamorphic images are provided herein. According to some implementations, the metamorphic images 715*a*-715*c*** may provide an up-to-date indication of progress that all players on a game have made. In some such examples, a wide area or linked metamorphic, e.g. a wide area or linked progressive, may have a visual representation that takes into account all players of a game and not just players on an individual gaming device. The lobby metamorphic images may be updated to reflect the current status of all players contributing.

According to some such examples, a server may be configured to receive game information, such as game event information, game play item information, etc., from each of a plurality of gaming devices that are currently being used to present one or more instances of a game corresponding to a wagering game image. The server also may be configured to provide metamorphic image data to the gaming devices that are currently being used to present one or more instances of the game, as well as to one or more devices that are being used to display a digital lobby like that shown in FIG. 7. The metamorphic image data may indicate how a metamorphic image corresponding to a wagering game image in the digital lobby should be displayed and/or updated. The metamorphic image data also may indicate how a metamorphic image that is being displayed on a gaming device that is currently being used to present a game corresponding to the wagering game image should be displayed and/or updated.

For example, the metamorphic image data may indicate that the state of the metamorphic image should change from a first state to a second state and that the displayed metamorphic image should be updated accordingly. Various examples of metamorphic image states and corresponding metamorphic images are provided herein. In some such examples, the metamorphic image data may indicate that the state of the metamorphic image should be incremented by one, from a current state to the next state. In some such examples, the metamorphic image data may indicate that the state of the metamorphic image should be re-set to a lower state, e.g., to the lowest state. Such an event may signify that a player has won an award corresponding to the metamorphic image and that the lowest state of the metamorphic image should be displayed. A control system of a gaming device that is presenting one or more instances of a game may be configured to receive the metamorphic image data from the server and to update a displayed metamorphic image according to the metamorphic image data. Similarly, a control system of a gaming device that is presenting a digital lobby may be configured to receive the metamorphic image data and to update a displayed metamorphic image of the digital lobby according to the metamorphic image data.

Figure 8:
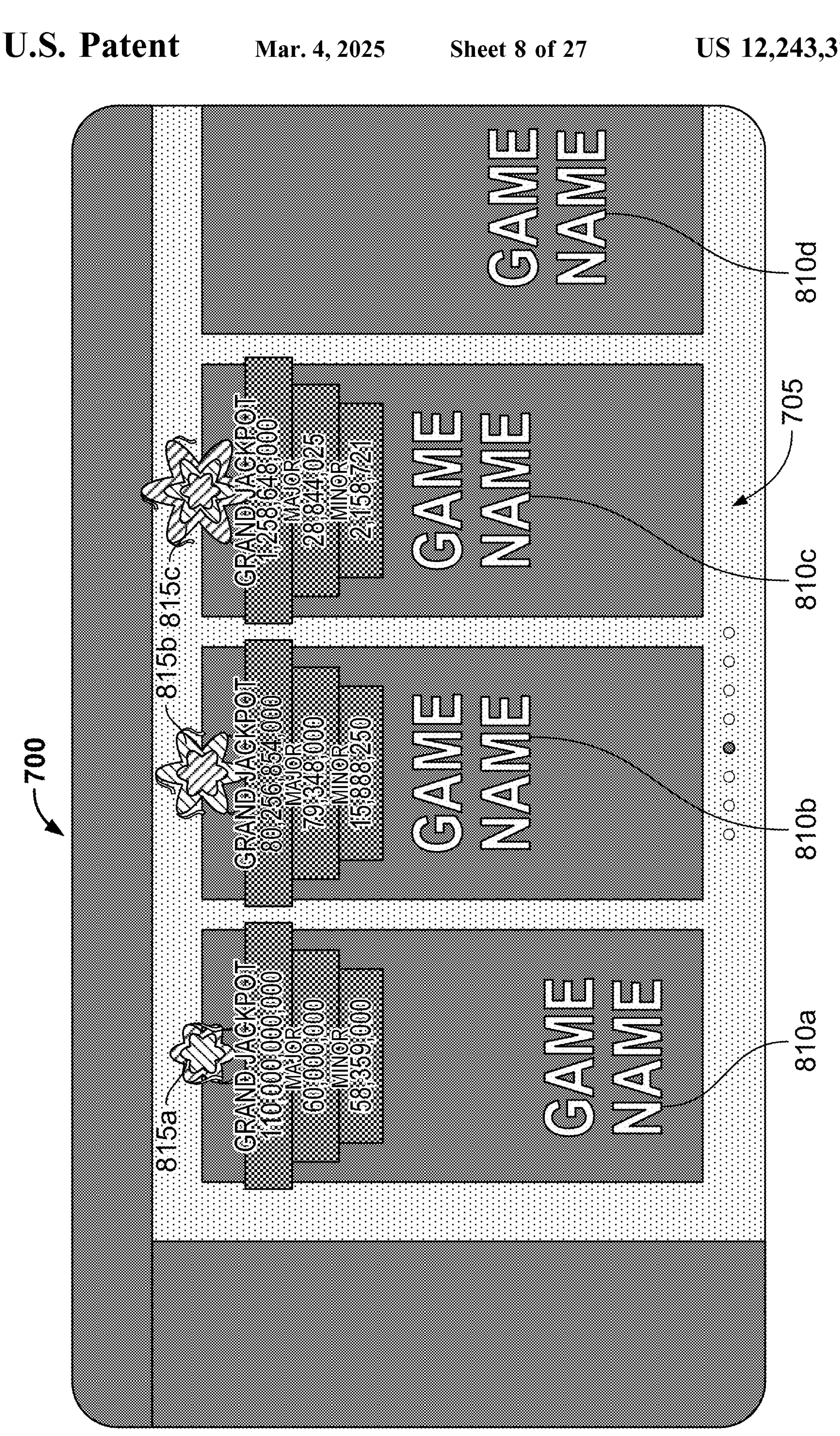
FIG. 8 shows an alternative example of wagering game images and corresponding metamorphic images being displayed on a gaming device.

FIG. 8 shows an alternative example of wagering game images and corresponding metamorphic images being displayed on a gaming device. As with other disclosed examples, the details of FIG. 8, including but not limited to the wagering game images and the metamorphic images, are merely shown by way of example. Moreover, the text "GAME NAME" that is shown in FIG. 8 and in other figures of this disclosure is intended to represent broadly any text and/or images that may be associated with a game theme. In the example shown in FIG. 8, the wagering game images and corresponding metamorphic images are being displayed on a display system 705 of a gaming device 700. In some examples, the gaming device 700 may be, or may include, an end user device such as those described above with reference to FIG. 4. However, in alternative examples the gaming device 700 may be, or may include, an EGM or another type of dedicated gaming device. In this implementation, the display system 705 is one example of the display system 505 that is described above with reference to FIG. 5.

In some examples, the type of presentation shown in FIG. 8 may correspond to a "digital lobby" for selection of a wagering game theme for online gaming. Such a digital lobby may be presented by a gaming entity via one or more servers, etc., of a data center such as that described above with reference to FIG. 4. However, in alternative examples the type of presentation shown in FIG. 8 may be made on a display system of an EGM or another type of dedicating gaming device.

In the example shown in FIG. 8, each of the wagering game images 810*a*-810*c* includes a grand jackpot meter, a major jackpot meter and a minor jackpot meter, indicating that a grand, major and minor jackpot could potentially be won if a player were to select the wagering game theme corresponding to a particular wagering game image. Some alternative wagering game images may include more, fewer or no jackpot meters. The number of jackpots available when playing a corresponding game theme may or may not match with the number of jackpot meters associated with a wagering game image. For example, a game theme may have four or more available jackpots, but not all of these jackpots may be displayed in a "digital lobby" or other game selection display, in part because of the area required to display the jackpot meters.

According to this example, each of the wagering game images 810*a*-810*c* also includes a corresponding one of the metamorphic images 815*a*-815*c*. However, in this example the wagering game image 810*d* does not include a corresponding metamorphic image. In some implementations, each of the metamorphic images 815*a*-815*c* may correspond to one or more awards of a game theme corresponding to the wagering game images 810*a*-810*c*. According to some implementations, each of the metamorphic images 815*a*-815*c* may correspond to a feature that may be triggered from a base game of a game theme. In some examples, each of the metamorphic images 815*a*-815*c* may correspond to a jackpot selection screen that is shown after a feature is awarded during a game theme corresponding to a wagering game image. In this example, each of the metamorphic images 815*a*-815*c* is associated with triggering a jackpot pick feature wherein the player must match 3 symbols to trigger an award of a corresponding jackpot. This differs from associating a metamorphic image with an individual jackpot because in this example a player can win one of N jackpots.

In this instance, each of the wagering game images 810*a*-810*c* has a different corresponding metamorphic image. However, in this example, the metamorphic images 815*a*-815*c* are all of the same "piñata" type. The differences in appearance between the metamorphic images 815*a*-815*c* indicates a difference in the state of each respective metamorphic image. As noted above, the "state" of a metamorphic image includes visual characteristics of the metamorphic image at a particular time. As the metamorphic image changes, its state changes. The state of a metamorphic image may, for example, correspond to a number of game events that have occurred in a corresponding game theme since an award has been granted. The state of a metamorphic image may or may not correspond to a probability of a corresponding award being granted, depending on the particular implementation.

In the example shown in FIG. 8, the states of the metamorphic images 815*a*-815*c* are indicated by the overall size of each metamorphic image and the number of shaded or colored regions within each metamorphic image. In this example, the state of the metamorphic image 815*a* indicates that the metamorphic image 815*a* has not yet metamorphosed to the state of the metamorphic image 815*b*, in part because the metamorphic image 815*b* is larger. Similarly, in this example the state of the metamorphic image 815*b* indicates that the metamorphic image 815*b* has not yet metamorphosed to the state of the metamorphic image 815*c*, in part because the metamorphic image 815*c* is larger and in part because the metamorphic image 815*b* includes two shaded or colored regions, whereas the metamorphic image 815*c* includes three shaded or colored regions.

According to some implementations, each of the metamorphic images 815*a*-815*c* may correspond to a feature that may be triggered from a base game of a game theme. In some such implementations, a particular symbol may need to land before a feature is triggered. When the particular symbol lands during an instance of a base game, effects (such as a spark, a projectile, dust, etc.) associated with that symbol may be directed to a metamorphic image and may appear to interact with the metamorphic image (e.g., may appear to cause the metamorphic image to spin, to grow, etc.). Subsequently, a feature may or may not be presented.

Accordingly, given a choice between game themes corresponding to the wagering game images 810*a*-810*d*, some players may decide to select the game theme corresponding to the wagering game image 810*c* because of the more evolved or advanced state of the corresponding metamorphic image 815*c*. This more evolved or advanced metamorphic state may indicate, or at least suggest, that an award of the corresponding game theme may soon be made or "triggered." However, some players may be more influenced by other factors, such as the current size of the grand jackpot, and may select a game theme based on such other factors.

Figure 9:
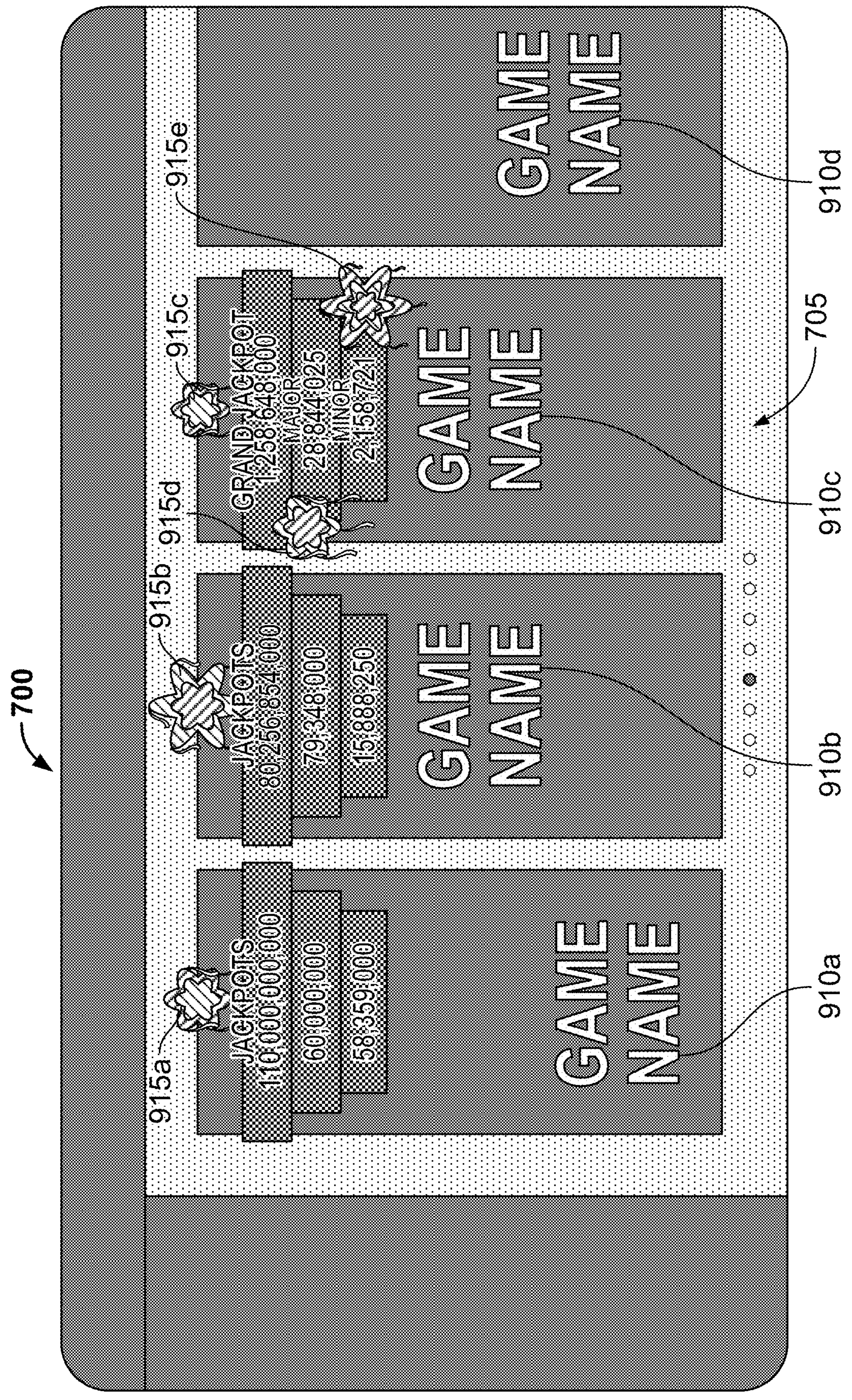
FIGS. 9-11 show additional examples of wagering game images and corresponding metamorphic images being displayed on a gaming device.
Figure 10:
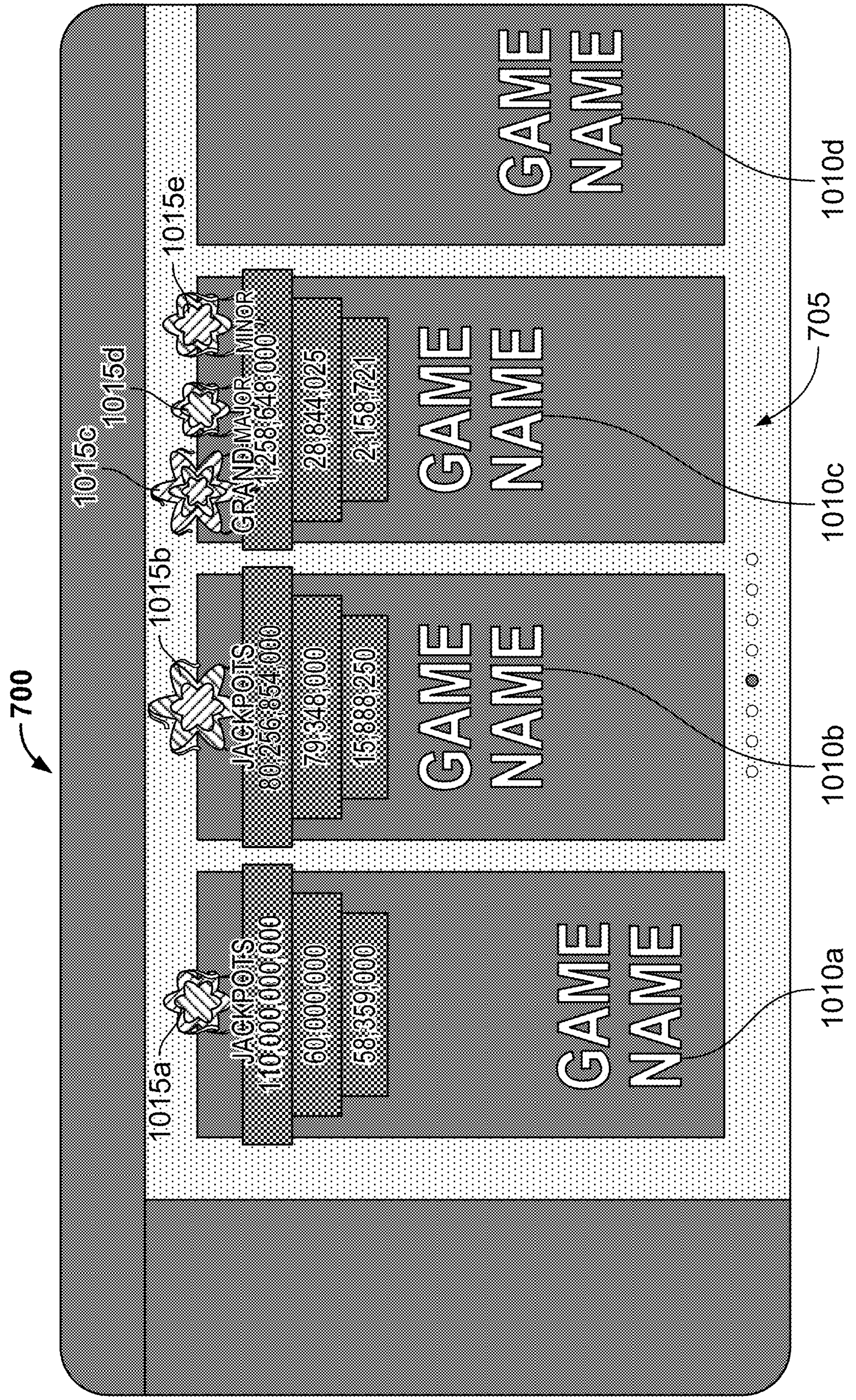
Figure 11:
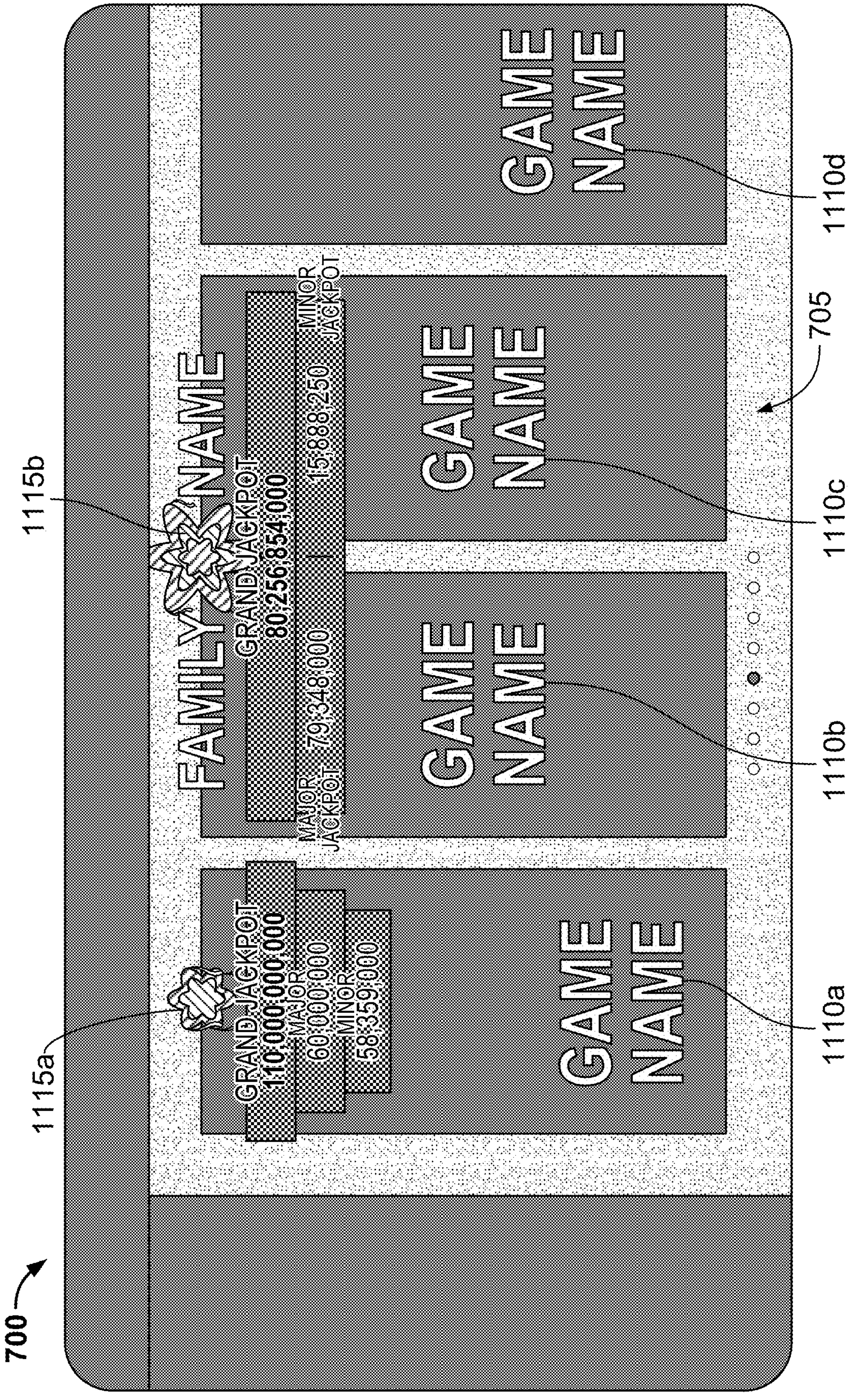

FIGS. 9-11 show additional examples of wagering game images and corresponding metamorphic images being displayed on a gaming device. Like the examples shown in FIGS. 7 and 8, FIGS. 9-11 show examples of game selection screens which, in some examples, may be displayed in a "digital lobby" context for online gaming. As with other disclosed examples, the details of FIGS. 9-11, including but not limited to the wagering game images and the metamorphic images, are merely shown by way of example. In the examples shown in FIGS. 9-11, the wagering game images and corresponding metamorphic images are being displayed on a display system 705 of a gaming device 700.

The implementations shown in FIGS. 9-11 involve metamorphic images that correspond in some way to one or more jackpots. In the example shown in FIG. 9, each of the wagering game images 910*a*-910*c* includes a grand jackpot meter, a major jackpot meter and a minor jackpot meter, indicating that a grand, major and minor jackpot could potentially be won if a player were to select the wagering game theme corresponding to a particular wagering game image. The wagering game image 910*c* includes a metamorphic image 915*c* that is associated with its grand jackpot meter, a metamorphic image 915*d* that is associated with its major jackpot meter and a metamorphic image 915*e* that is associated with its minor jackpot meter. The state of the metamorphic image 915*e* is more evolved or advanced than the state of the metamorphic images 915*c* and 915*d*, which suggests (and may actually indicate) that the minor jackpot, or a feature that is associated with the minor jackpot, is relatively more likely to be awarded.

In this example, the wagering game image 910*a* has a single corresponding metamorphic image 915*a* and the wagering game image 910*b* has a single corresponding metamorphic image 915*b*. In some examples, the metamorphic images 915*a* and 915*b* may each be associated with one or more of the jackpots available in the game themes associated with wagering game images 910*a* and 910*b*. In some implementations, the states of the metamorphic images 915*a* and/or 915*b* may correspond with a single one of the available jackpots, which may or may not be one of the displayed jackpots. Alternatively, or additionally, the states of the metamorphic images 915*a* and/or 915*b* may correspond with a feature that may potentially lead to an award of any one of a plurality of available jackpots. Regardless of what the states of the metamorphic images 915*a* and/or 915*b* actually signify, some players may believe the game theme associated with the wagering game image 910*b* to be relatively more desirable than the game theme associated with the wagering game image 910*a*, based in part on the more advanced state of the metamorphic image 915*b*.

In the example shown in FIG. 10, each of the wagering game images 1010*a*-1010*c* includes a grand jackpot meter, a major jackpot meter and a minor jackpot meter, indicating that a grand, major and minor jackpot could potentially be won if a player were to select the wagering game theme corresponding to a particular wagering game image. The wagering game image 1010*c* includes a metamorphic image 1015*c* that is associated with its grand jackpot meter, a metamorphic image 1015*d* that is associated with its major jackpot meter and a metamorphic image 1015*e* that is associated with its minor jackpot meter. The state of the metamorphic image 1015*c* is more evolved or advanced than the state of the metamorphic images 1015*d* and 1015*e*, which suggests (and may actually indicate) that the grand jackpot, or a feature that is associated with the grand jackpot, is relatively more likely to be awarded.

In this example, the wagering game image 1010*a* has a single corresponding metamorphic image 1015*a* and the wagering game image 1010*b* has a single corresponding metamorphic image 1015*b*. The metamorphic images 1015*a* and 1015*b* may, in some examples, each be associated with one or more of the jackpots available in the game themes associated with wagering game images 1010*a* and 1010*b*. Alternatively, or additionally, the states of the metamorphic images 1015*a* and/or 1015*b* may correspond with a feature that may potentially lead to an award of any one of a plurality of available jackpots. Regardless of what the states of the metamorphic images 1015*a* and/or 1015*b* actually signify, some players may believe the game theme associated with the wagering game image 1010*b* to be relatively more desirable than the game theme associated with the wagering game image 1010*a*, based in part on the more advanced state of the metamorphic image 1015*b*.

In the example shown in FIG. 11, the wagering game image 1110*a* has a single corresponding metamorphic image 1115*a*. The wagering game image 1110*a* and the corresponding metamorphic image 1115*a* may, in some implementations, be similar to the wagering game images 910*a* and 1010*a* and the corresponding metamorphic images 915*a* and 1015*a* that are described above.

However, the wagering game images 1110*b* and 1110*c* have a single, shared corresponding metamorphic image 1115*b*. In this example, the game themes associated with the wagering game images 1110*b* and 1110*c* are in the same family of game themes. Here, both game themes share the same grand, major and minor jackpots. Although the metamorphic image 1115*b* is adjacent to the grand jackpot meter, the metamorphic image 1115*b* may or may not actually be associated with the grand jackpot, depending on the particular implementation. In some implementations the metamorphic image 1115*b* may be associated with one or more of the other jackpots available in the family of game themes associated with the wagering game images 1110*b* and 1110*c*. In some implementations, the state of the metamorphic image 1115*b* may correspond with a single one of the available jackpots, which may or may not be one of the displayed jackpots. Alternatively, the state of the metamorphic image 1115*b* may correspond with a feature that may potentially lead to an award of any one of a plurality of available jackpots. Regardless of what the states of the metamorphic images 1115*a* and/or 1115*b* actually signify, some players may believe the game themes associated with the metamorphic image 1115*b* to be relatively more desirable than the game theme associated with the metamorphic image 1115*a*, based in part on the more advanced state of the metamorphic image 1115*b*.

FIGS. 12A-15B show examples of gaming device displays according to some implementations. FIGS. 12A-15B show examples of wagering game images and corresponding metamorphic images that may be displayed on a display system 705 of a gaming device 700 after a user has selected a particular game. In some examples, the player may have selected a game by providing user input to the gaming device 700 indicating a selection of a wagering game image from a "digital lobby" presentation, such as those described above with reference to FIGS. 7-11.

Figure 12A:
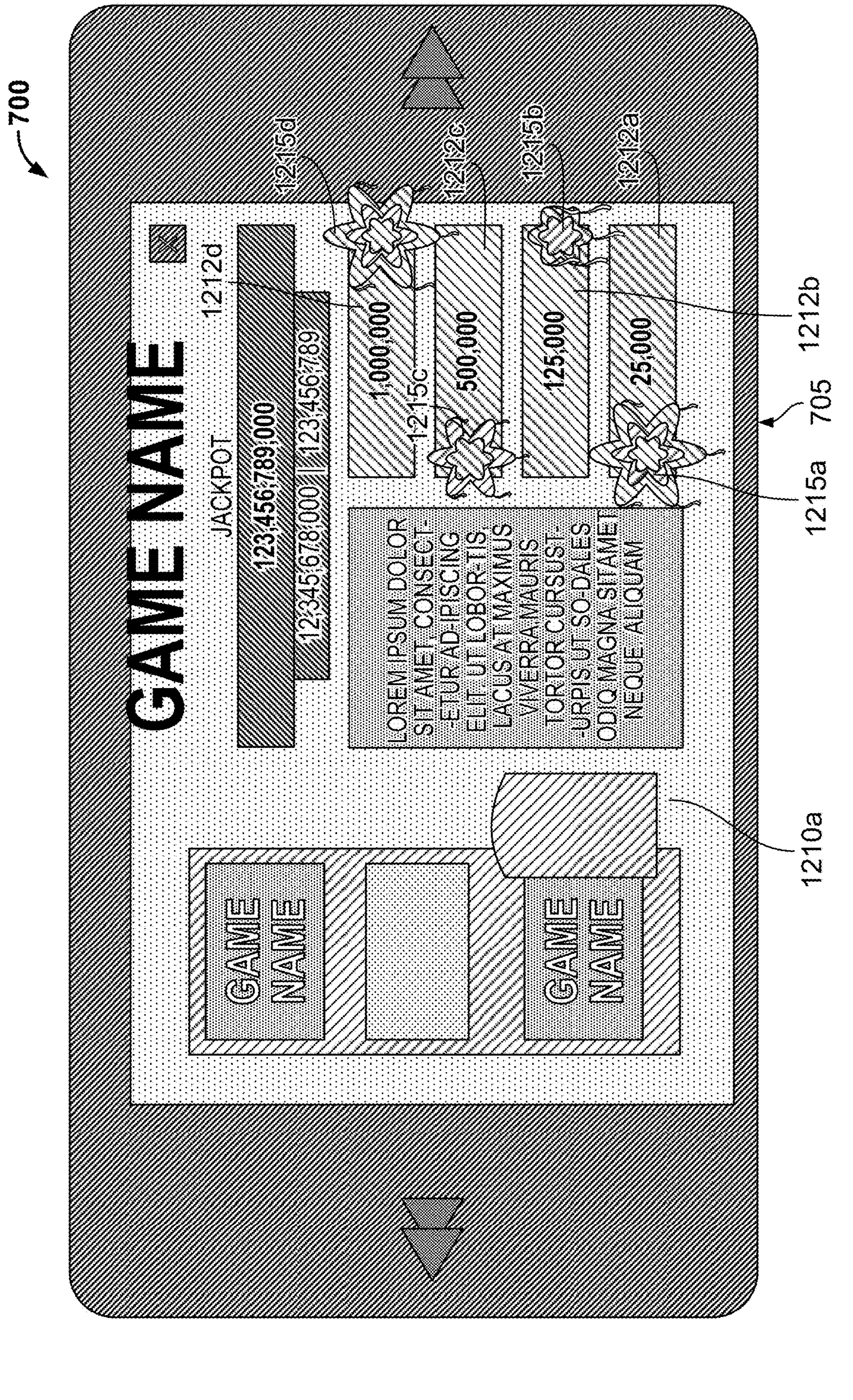
FIGS. 12A-15B show examples of gaming device displays according to some implementations.

In the example shown in FIG. 12A, the wagering game image 1210*a* includes a game theme name, related text, and jackpot meters corresponding to at least some of the jackpots that may potentially be awarded when playing this game. According to this example, the wagering game image 1210*a* also includes bet level indications 1212*a*-1212*d*. In some examples, the bet level indications 1212*a*-1212*d*, or similar bet level indications, may correspond to particular wager amounts. For example, the bet level indication 1212*a* may correspond to a bet or wager of precisely 25,000 credits and the bet level indication 1212*b* may correspond to a bet or wager of precisely 125,000 credits. However, in other implementations the bet level indications 1212*a*-1212*d*, or similar bet level indications, may correspond to bet bracket amounts. For example, the bet level indication 1212*b* may correspond to a bet or wager that is more than 25,000 credits and less than or equal to 125,000 credits.

According to some implementations, there may be a plurality of bet levels (e.g., 5, 10 or more levels) within a particular bet bracket. In some implementations, the jackpots for each bet bracket may be entirely different, whereas in other implementations a player may be eligible for one or more (e.g., all) of the lower-level jackpots associated with lower-level bet brackets, in addition to the jackpot associated with a particular higher-level bet bracket. According to some examples, each metamorphic image may be associated with a feature that may allow a player the ability to win an award associated with one or more of the jackpots indicated by the jackpot meters shown in FIG. 12A, or in some examples an award associated with another jackpot that is not shown in FIG. 12A.

In this example, each of the bet level indications 1212*a*-1212*d* has a corresponding metamorphic image 1215*a*-1215*d*. A player may take the state of the metamorphic images 1215*a*-1215*d* into account when selecting a bet level. For example, a player may see that the state of the metamorphic image 1215*d* is relatively more advanced than the state of the metamorphic images 1215*b* and 1215*c*. The player may interpret the relatively more advanced state of the metamorphic image 1215*d* as an indication that he or she may have a good chance of being awarded a jackpot if he or she makes a wager corresponding to the bet level indication 1212*d*.

Figure 12B:
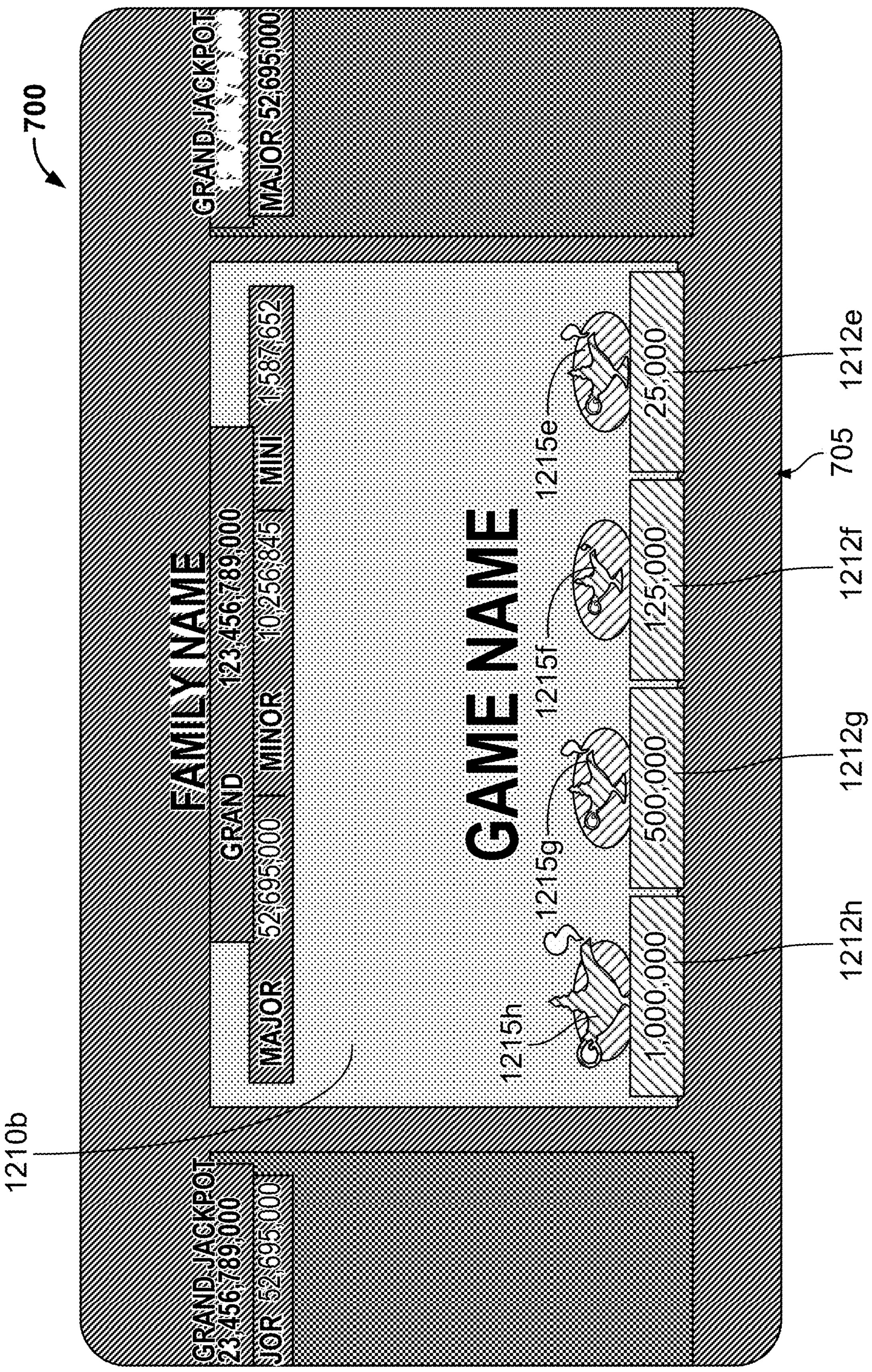

In the example shown in FIG. 12B, the wagering game image 1210*b* includes a game theme name, a game theme family name, and jackpot meters corresponding to at least some of the jackpots that may potentially be awarded when playing this game. According to this example, the wagering game image 1210*b* also includes bet level indications 1212*e*-1212*h*. As with the examples described above with reference to FIG. 12A, the bet level indications 1212*e*-1212*h* may correspond to particular wager amounts or to bet bracket amounts, depending on the particular implementation.

In some implementations, the jackpots for each bet bracket may be entirely different, whereas in other implementations a player may be eligible for one or more (e.g., all) of the lower-level jackpots associated with lower-level bet brackets, in addition to the jackpot associated with a particular higher-level bet bracket. According to some examples, each metamorphic image may be associated with a feature that may allow a player the ability to win an award associated with one or more of the jackpots indicated by the jackpot meters shown in FIG. 12B, or in some examples an award associated with another jackpot that is not shown in FIG. 12B.

In this example, each of the bet level indications 1212*e*-1212*h* has a corresponding metamorphic image 1215*e*-1215*h*. A player may take the state of the metamorphic images 1215*e*-1215*h* into account when selecting a bet level. For example, a player may see that the state of the metamorphic image 1215*f* is the least advanced of the metamorphic images 1215*e*-1215*h*, because the lamp is the smallest and is emitting the least smoke, whereas the state of the metamorphic image 1215*h* is the most advanced. The player may interpret the relatively more advanced state of the metamorphic image 1215*h* as an indication that he or she may have a good chance of being awarded a jackpot if he or she makes a wager corresponding to the bet level indication 1212*h*.

Figure 13A:
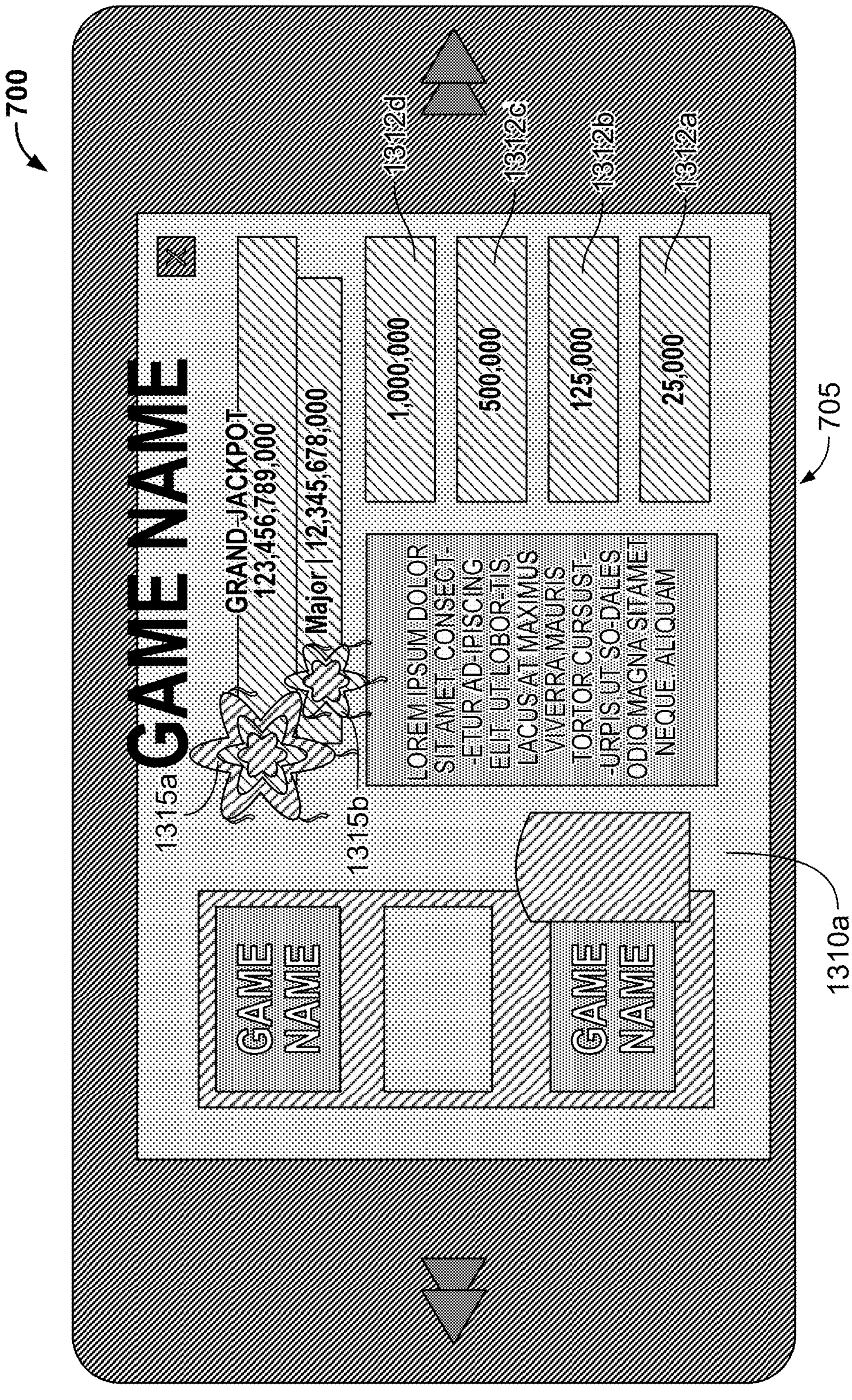

In the example shown in FIG. 13A, the wagering game image 1310*a* includes a game theme name, related text, and jackpot meters corresponding to a grand jackpot and a major jackpot that may potentially be awarded when playing this game. According to this example, the wagering game image 1310*a* also includes bet level indications 1312*a*-1312*d*. In some examples, the bet level indications 1312*a*-1312*d* may be similar to the bet level indications 1212*a*-1212*d* that are described above with reference to FIG. 12A.

In this example, the grand jackpot has a corresponding metamorphic image 1315*a* and the major jackpot has a corresponding metamorphic image 1315*b*. A player may take the state of the metamorphic images 1315*a* and 1315*b* into account when deciding whether to play a game that is associated with the wagering game image 1310*a*. For example, a player may see that the state of the metamorphic image 1315*a* is quite advanced. The player may interpret the relatively more advanced state of the metamorphic image 1315*a* as an indication that he or she may have a good chance of being awarded the grand jackpot if he or she plays the game. According to some implementations, a player may need to wager at a predetermined level, such as the level corresponding to the bet level indication 1312*d*, in order to be eligible to win the grand jackpot.

Figure 13B:
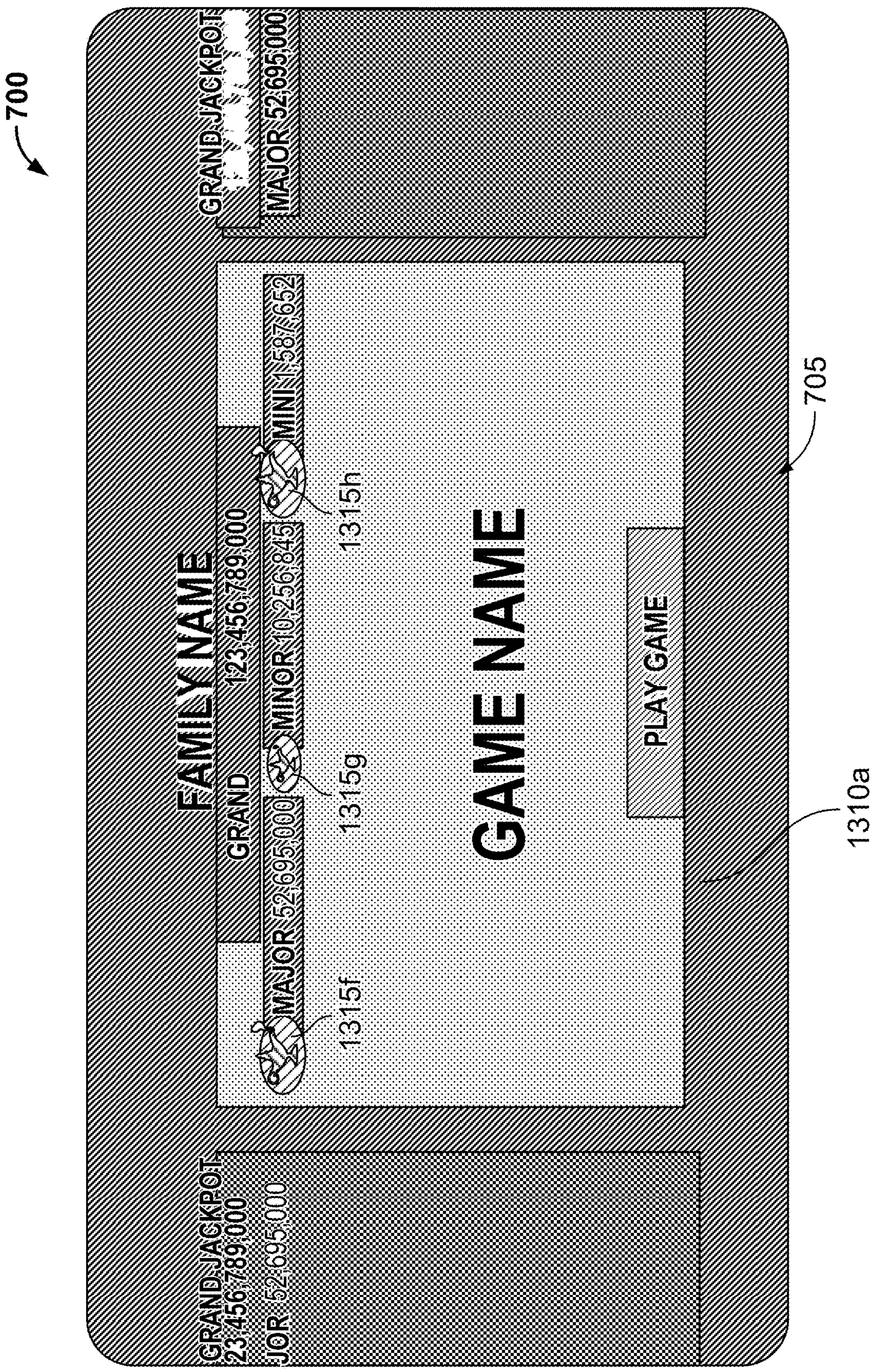

In the example shown in FIG. 13B, the wagering game image 1310*b* includes a game theme name, a game theme family name, and jackpot meters corresponding to at least some of the jackpots that may potentially be awarded when playing this game. In this example, the grand jackpot has a corresponding metamorphic image 1315*e*, the major jackpot has a corresponding metamorphic image 1315*f*, the minor jackpot has a corresponding metamorphic image 1315*g* and the mini jackpot has a corresponding metamorphic image 1315*h*. A player may take the state of the metamorphic images 1315*e*-1315*h* into account when deciding whether to play a game that is associated with the wagering game image 1310*b*. For example, a player may see that the state of the metamorphic image 1315*e* is quite advanced. The player may interpret the relatively more advanced state of the metamorphic image 1315*a* as an indication that he or she may have a good chance of being awarded the grand jackpot if he or she plays the game.

Figure 14:
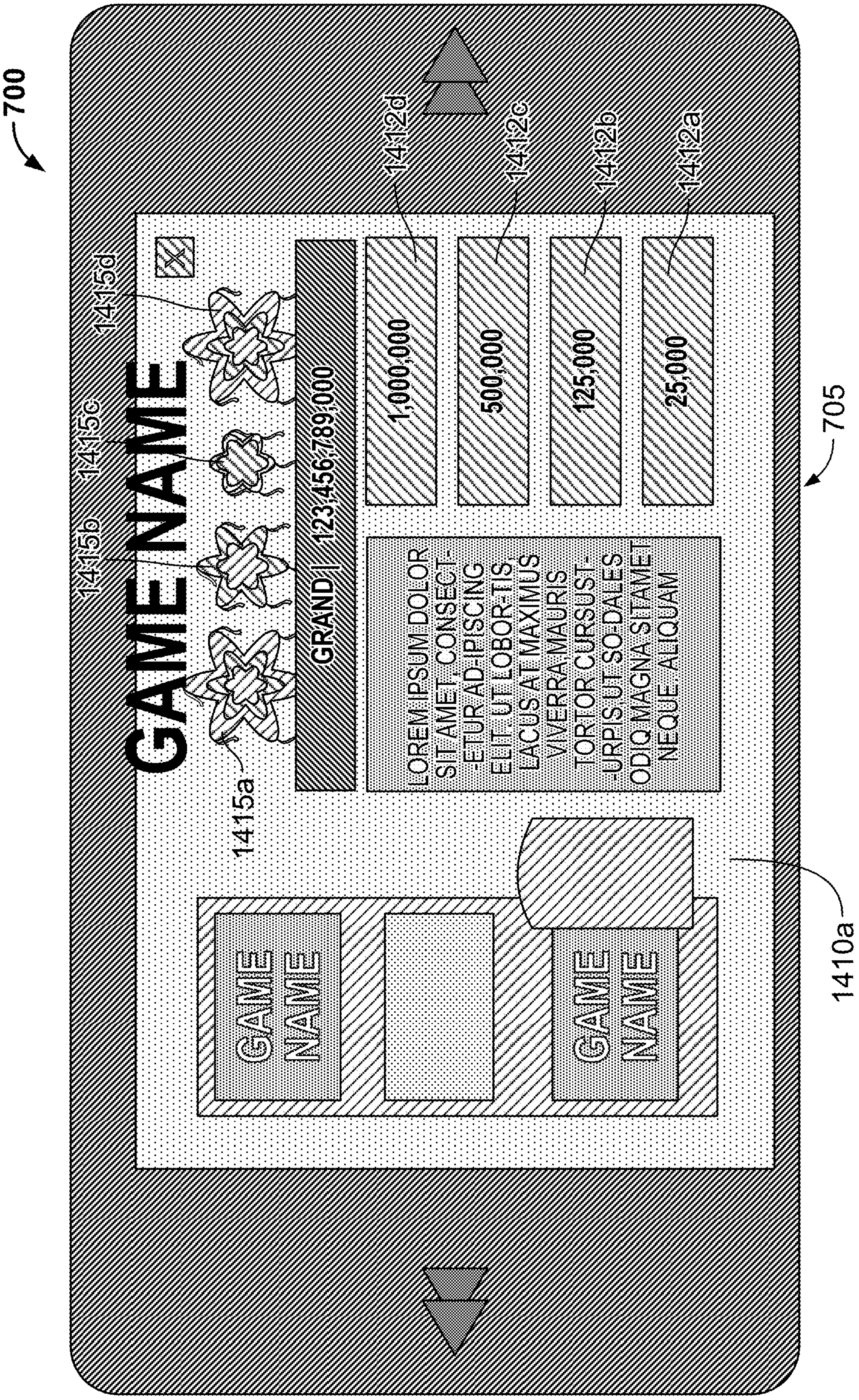

In the example shown in FIG. 14, the wagering game image 1410 includes a game theme name, related text, and a jackpot meter corresponding to a grand jackpot that may potentially be awarded when playing this game. According to this example, the wagering game image 1410 also includes bet level indications 1412*a*-1412*d*. In some examples, the bet level indications 1412*a*-1412*d* may be similar to the bet level indications 1212*a*-1212*d* that are described above with reference to FIG. 12A.

This example includes metamorphic images 1415*a*-1415*d*. According to some examples, the wagering game image 1410 may be used to make a correlation between each of the metamorphic images 1415*a*-1415*d* and a particular bet level indication. For example, the bet level indication 1412*d* may correspond to the metamorphic image 1415*a*. In some instances, a detected touch on (or hover over) a bet level indication may cause a change in the appearance of the corresponding metamorphic image. For example, if a control system receives an indication of a detected touch on (or hover over) the bet level indication 1412*d*, the control system may cause the corresponding metamorphic image (e.g., 1415*a*) to be displayed at a larger size.

Figure 15A:
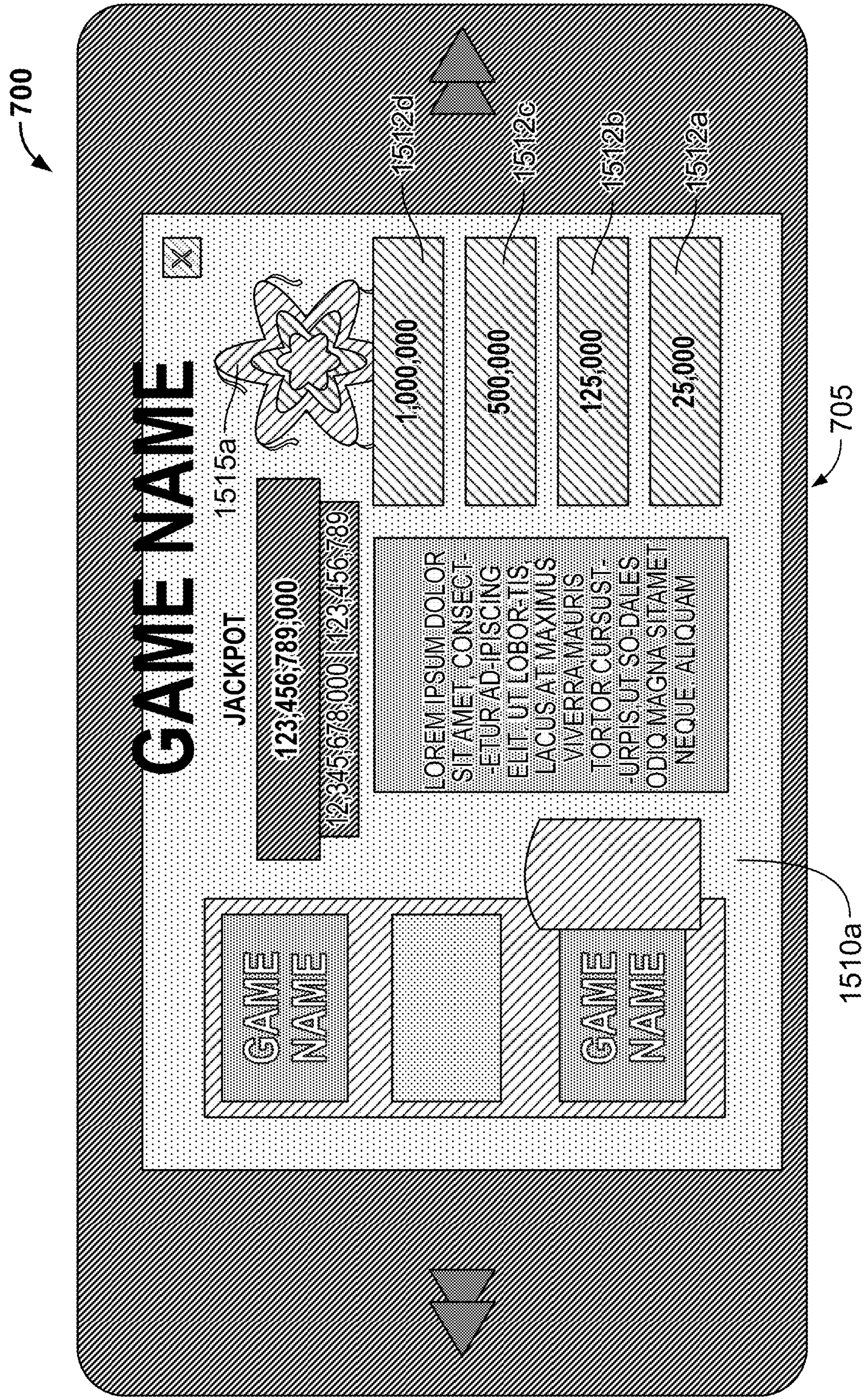

In the example shown in FIG. 15A, the wagering game image 1510*a* includes a game theme name, related text, and jackpot meters corresponding to a grand jackpot, a major jackpot and a minor jackpot that may potentially be awarded when playing this game. According to this example, the wagering game image 1510*a* also includes bet level indications 1512*a*-1512*d*. In some examples, the bet level indications 1512*a*-1512*d* may be similar to the bet level indications 1212*a*-1212*d* that are described above with reference to FIG. 12A.

In this example, the location of the metamorphic image 1515*a* suggests that the metamorphic image 1515*a* is related to the grand jackpot. However, this may or may not be the case, depending on the particular implementation. Moreover, the fact that the metamorphic image 1515*a* is located at the top of the bet level indications 1512*a*-1512*d* suggests that the metamorphic image 1515*a* is related to the 1 million credit bet level. In some examples, the metamorphic image 1515*a* may be associated with another wager level, or to another range of wager levels. In some implementations, the metamorphic image may not actually be tied to a particular wager level, or to a particular range of wager levels. For example, the metamorphic image 1515*a* may correspond to the metamorphic having the most evolved or advanced metamorphic state, among a plurality of metamorphics associated with a particular game theme. However, placing the metamorphic near the highest wager level suggests a connection between the metamorphic image 1515*a* and a bet level, and may therefore be beneficial.

Figure 15B:
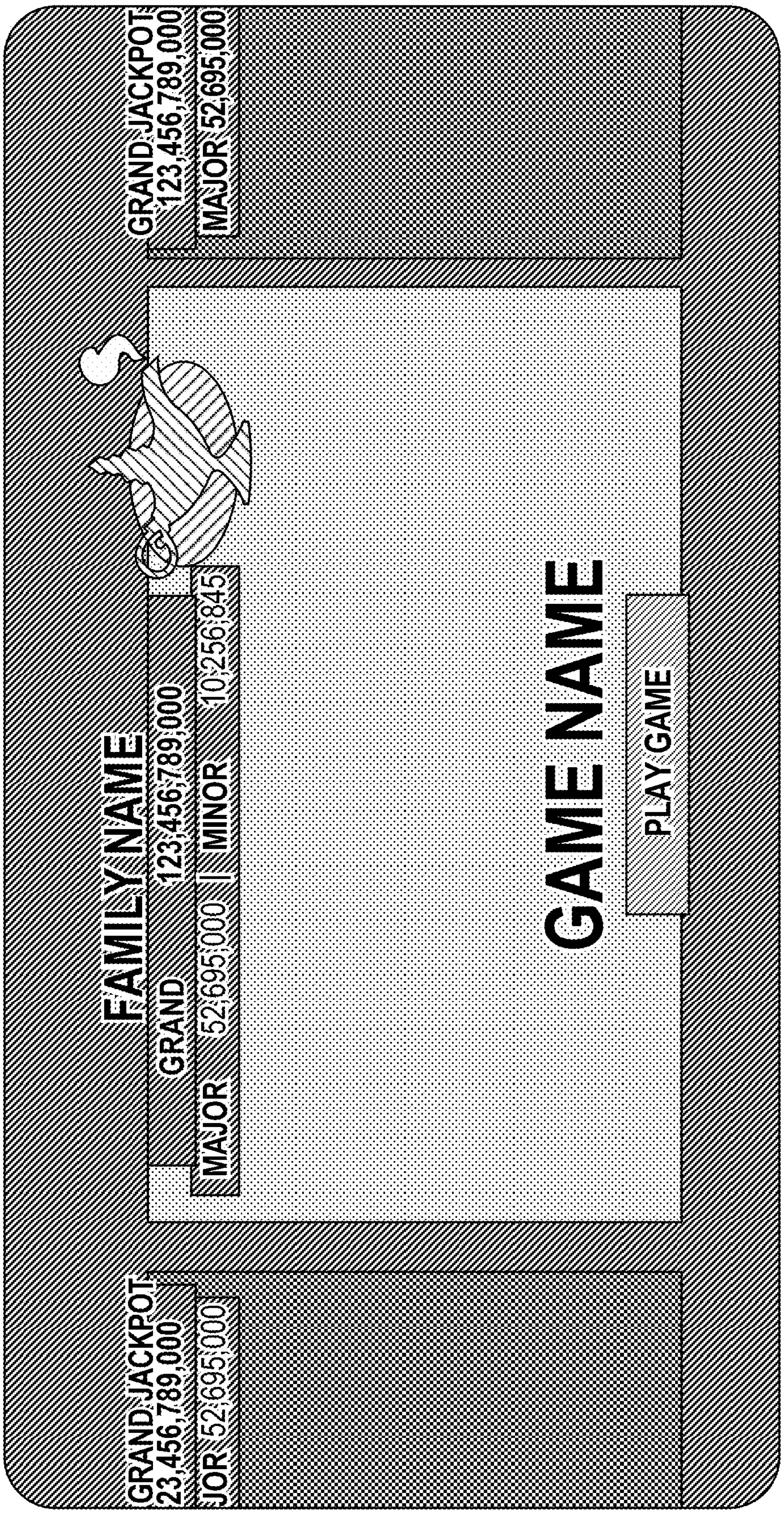

In the example shown in FIG. 15B, the wagering game image 1510*b* includes a game theme name, a game family name, and jackpot meters corresponding to a grand jackpot, a major jackpot and a minor jackpot that may potentially be awarded when playing this game. In this example, the location of the metamorphic image 1515*b* does not suggest that the metamorphic image 1515*b* is related to any particular jackpot. However, the metamorphic image 1515*b* may or may not be related to any particular jackpot, depending on the implementation. The relatively advanced state of the metamorphic image 1515*b* may suggest to a player that a feature, a jackpot, etc. is likely to be awarded soon. Therefore, a player may be persuaded to play this game in view of the state of the metamorphic image 1515*b*.

FIGS. 16-19 show some alternative examples of images being displayed on a gaming device. In the examples shown in FIGS. 16-18, the wagering game images and corresponding metamorphic images may be displayed on a display system 705 of a gaming device 700 during an attract sequence and/or a game selection process. The gaming device 700 is an example of the apparatus 500 that is described above with reference to FIG. 5. In some examples, the gaming device 700 may be, or may include, an EGM or another type of dedicated gaming device. However, in alternative examples the gaming device 700 may be, or may include, an end user device such as those described above with reference to FIG. 4. In these examples, the display system 705 is an example of the display system 505 that is described above with reference to FIG. 5.

Figure 16:
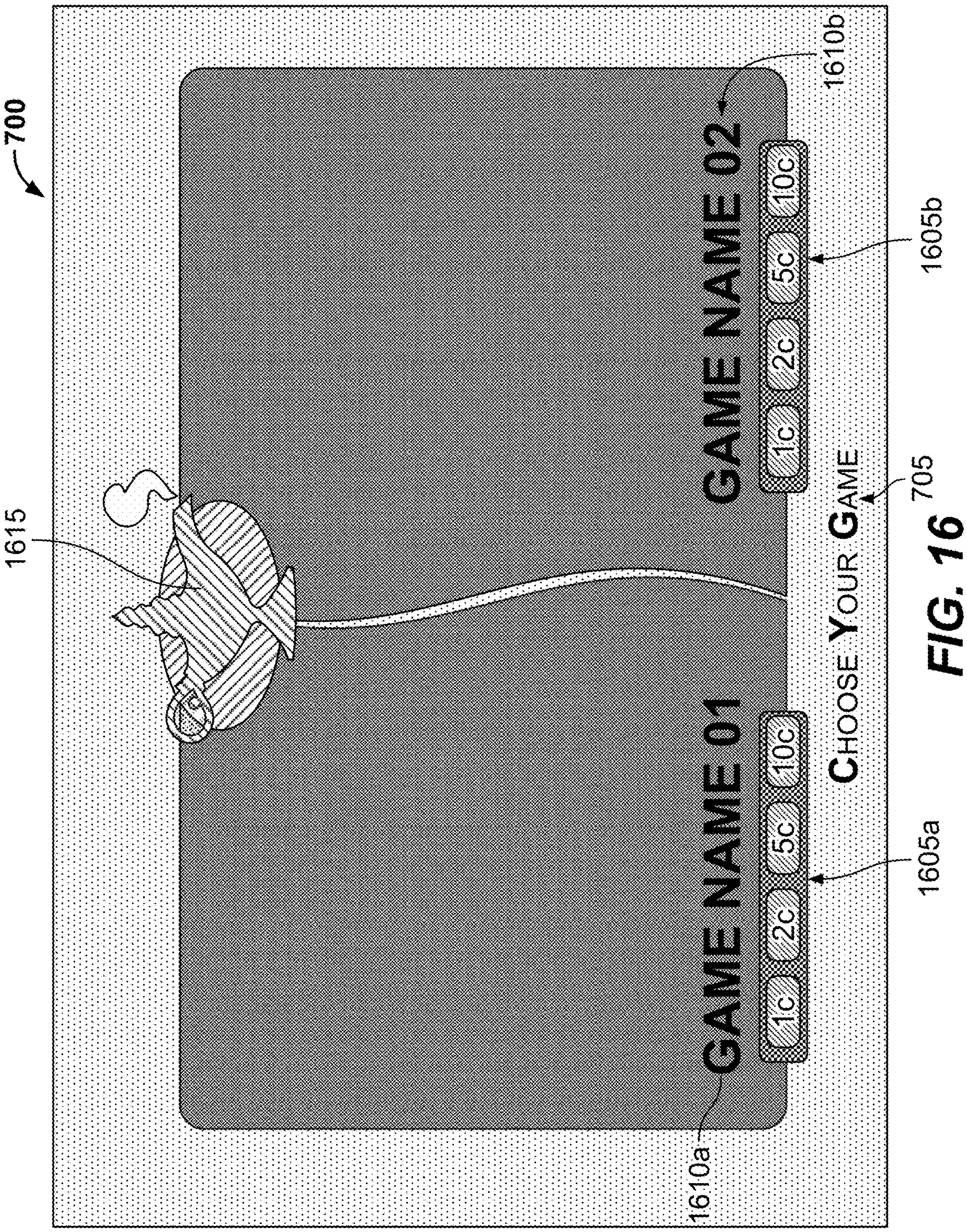
FIGS. 16-19 show some alternative examples of metamorphic images being displayed on a gaming device.

In the example shown in FIG. 16, a control system of gaming device 700 is configured for controlling the display system 705 to present wagering game images 1610*a* and 1610*b*, each of which corresponds to a different game theme. According to some examples, the game themes may be in the same family (e.g., Buffalo™ and Buffalo Gold™, or Queen of the Nile™ and Queen of the Nile Deluxe™).

According to this example, the control system is configured for controlling the display system 705 to present a metamorphic image 1615 corresponding to an award, such as a jackpot, that is potentially available on each of the game themes. The metamorphic image 1615 is one example of a "linked" metamorphic that is shared by multiple games. Based on the relatively advanced state of the metamorphic image 1615, a player may decide to play at this gaming device, e.g., at this EGM.

In this example, the display system 705 is also presenting denomination selection images 1605*a* and 1605*b*, with which a user may interact in order to select a denomination for a selected game theme. According to some implementations, the state of the metamorphic image 1615 may be different for different selected denominations. In some such implementations, the metamorphic image having the most developed state may be the one selected for display, e.g., as part of an attract sequence.

Figure 17:
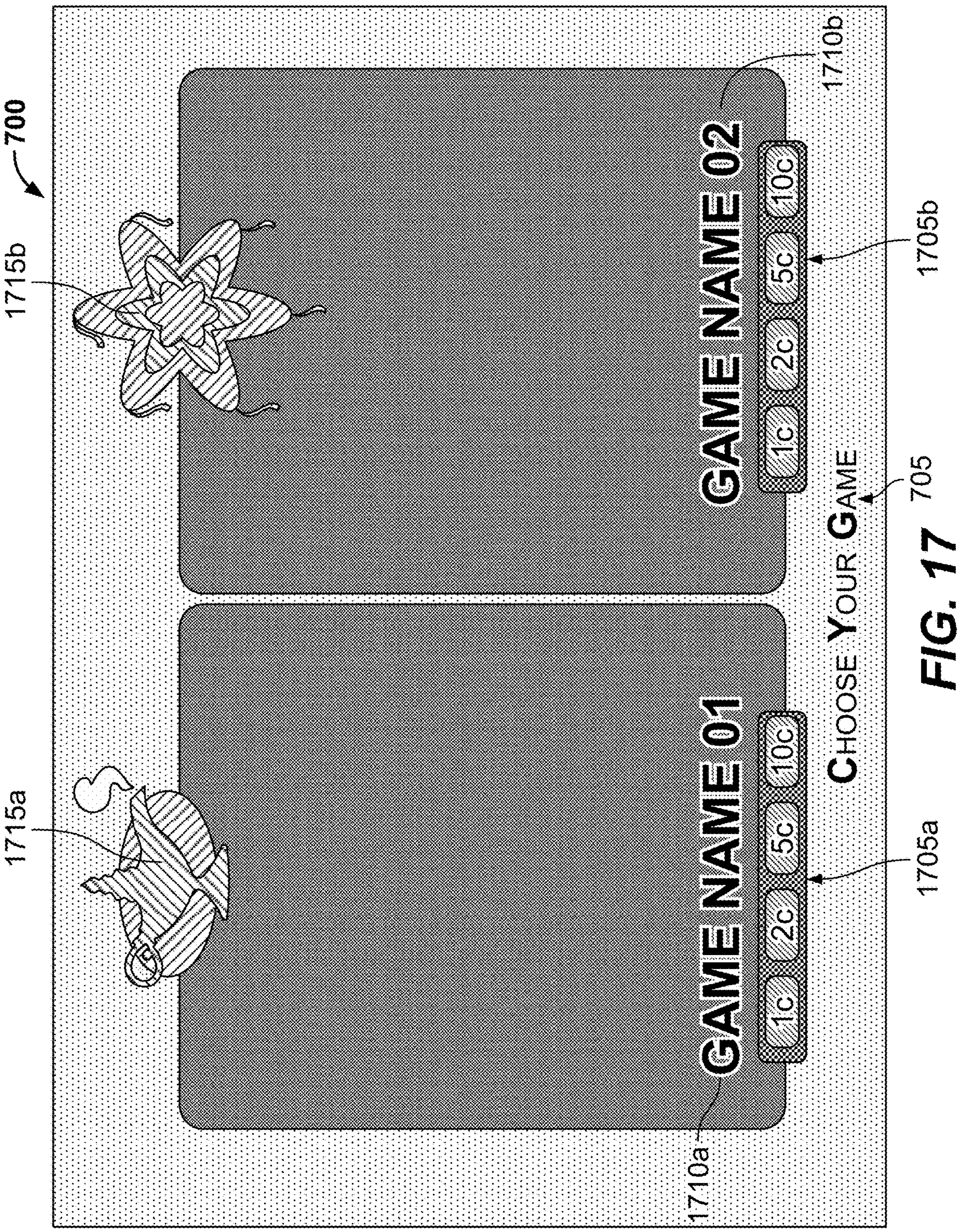

In the example shown in FIG. 17, the display system 705 is presenting wagering game images 1710*a* and 1710*b*, each of which corresponds to a different game theme. According to some examples, the game themes may be in the same family.

According to this example, the wagering game image 1710*a* has a corresponding metamorphic image 1715*a* and the wagering game image 1710*b* has a corresponding metamorphic image 1715*b*. The metamorphic images 1715*a* and 1715*b* may correspond to an award, such as a jackpot, that is potentially available on the corresponding game theme. Based on the relatively advanced states of the metamorphic images 1715*a* and 1715*b*, a player may decide to play at this gaming device, e.g., at this EGM.

However, because the metamorphic images 1715*a* and 1715*b* are of different types in this example, the player cannot compare the states of the metamorphic images 1715*a* and 1715*b* directly, without further information regarding the possible states of each type of metamorphic image. In some examples, such information may be available via the gaming device 700, whereas in other examples a player may need to acquire such information by personal familiarity with the underlying game themes, or game families.

In this example, the display system 705 is also presenting denomination selection images 1705*a* and 1705*b*, with which a user may interact in order to select a denomination for a selected game theme. According to some implementations, the state of the metamorphic images 1715*a* and 1715*b* may be different for different selected denominations. In some such implementations, the metamorphic images having the most developed states may be the ones selected for display.

Figure 18:
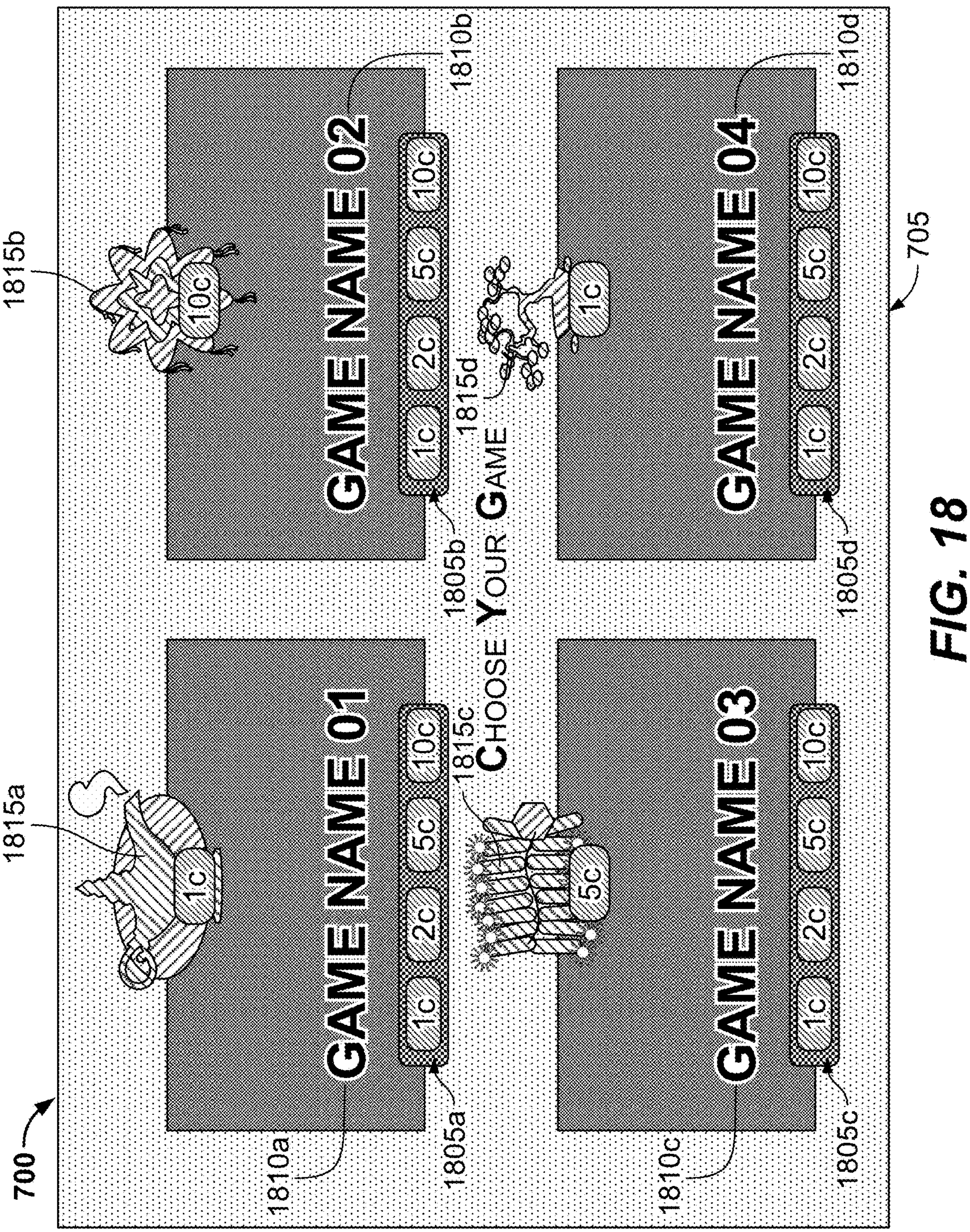

In the implementation shown in FIG. 18, the display system 705 is presenting wagering game images 1810*a*-1810*d*, each of which corresponds to a different game theme. According to some examples, the game themes may be in the same family. In this example, the wagering game images 1810*a*-1810*d* have corresponding metamorphic images 1815*a*-1815*d*. The metamorphic images 1815*a*-1815*d* may correspond to an award, such as a jackpot, that is potentially available on the corresponding game theme. Based on the states of one or more of the metamorphic images 1815*a*-1815*d*, a player may decide to play at this gaming device, e.g., at this EGM. The state of the metamorphic image 1815*c* is indicated, at least in part, by the number of lit firecrackers in the image. The state of the metamorphic image 1815*d* is indicated, at least in part, by the size of the tree image. A player may be motivated to select a particular wagering game image based, at least in part, on the state(s) of the associated metamorphic image(s).

In this example, the display system 705 is also presenting denomination selection images 1805*a*-1805*d*, with which a user may interact in order to select a denomination for a selected game theme. According to some implementations, the state of the metamorphic images 1815*a*-1815*d* may be different for different selected denominations. In some such implementations, the metamorphic images having the most developed states may be the ones selected for display.

In some examples, the gaming device 700 may be configured to allow a player to pick only one of the four game themes and only one game with be played at a time. In other examples, such as some implementations of Aristocrat's Wonder4™ game, the gaming device 700 may be configured to allow a player to play four games at once. According to some such examples, the gaming device 700 may be configured to allow a player to play four different types of games at once. In other examples, the gaming device 700 may be configured to allow a player to play four instances of the same game at once. In some implementations, a player may be able to "mix and match" game selections: the gaming device 700 may be configured to allow a player to select 3 instances of one type of game and 1 instance of another type of game.

Other implementations may allow a player to select from more or fewer than four wagering game images. In other examples, the games shown in FIG. 18 may have previously been selected from another GUI that allows a player to select from more than four wagering game images.

Figure 19A:
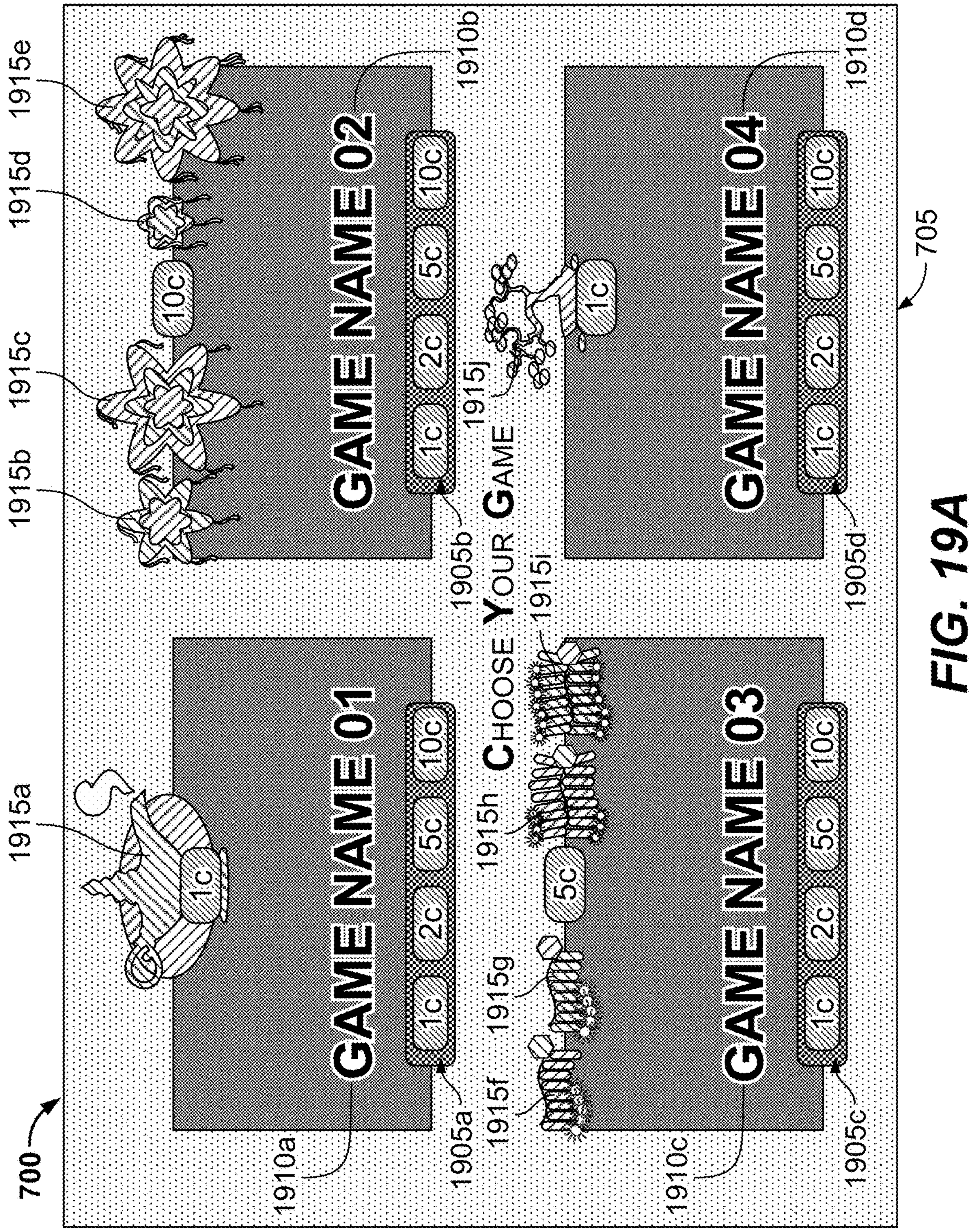

In the implementation shown in FIG. 19A, the display system 705 is presenting wagering game images 1910*a*-1910*d*, each of which corresponds to a different game theme. According to some examples, the game themes may be in the same family. In this example, the wagering game images 1910*a*-1910*d* have corresponding metamorphic images 1915*a*-1915*j*: the wagering game image 1910*a* has the corresponding metamorphic image 1915*a*, the wagering game image 1910*b* has the corresponding metamorphic images 1915*b*-1915*e*, the wagering game image 1910*c* has the corresponding metamorphic images 1915*f*-1915*i*, and the wagering game image 1910*d* has the corresponding metamorphic image 1915*j*. The metamorphic images 1915*a*-1915*j* may correspond to an award, such as a jackpot, that is potentially available on the corresponding game theme. In some examples, each of the metamorphic images 1915*b*-1915*e* and/or the metamorphic images 1915*a*-1915*j* may be associated with an individual progressive jackpot.

Based on the states of one or more of the metamorphic images 1915*a*-1915*j*, a player may decide to play at this gaming device, e.g., at this EGM. In some examples, a player may be motivated to select a particular wagering game image based, at least in part, on the state(s) of the associated metamorphic image(s). In some examples, the gaming device 700 may be configured to allow a player to select games as described above with reference to FIG. 18.

Figure 19B:
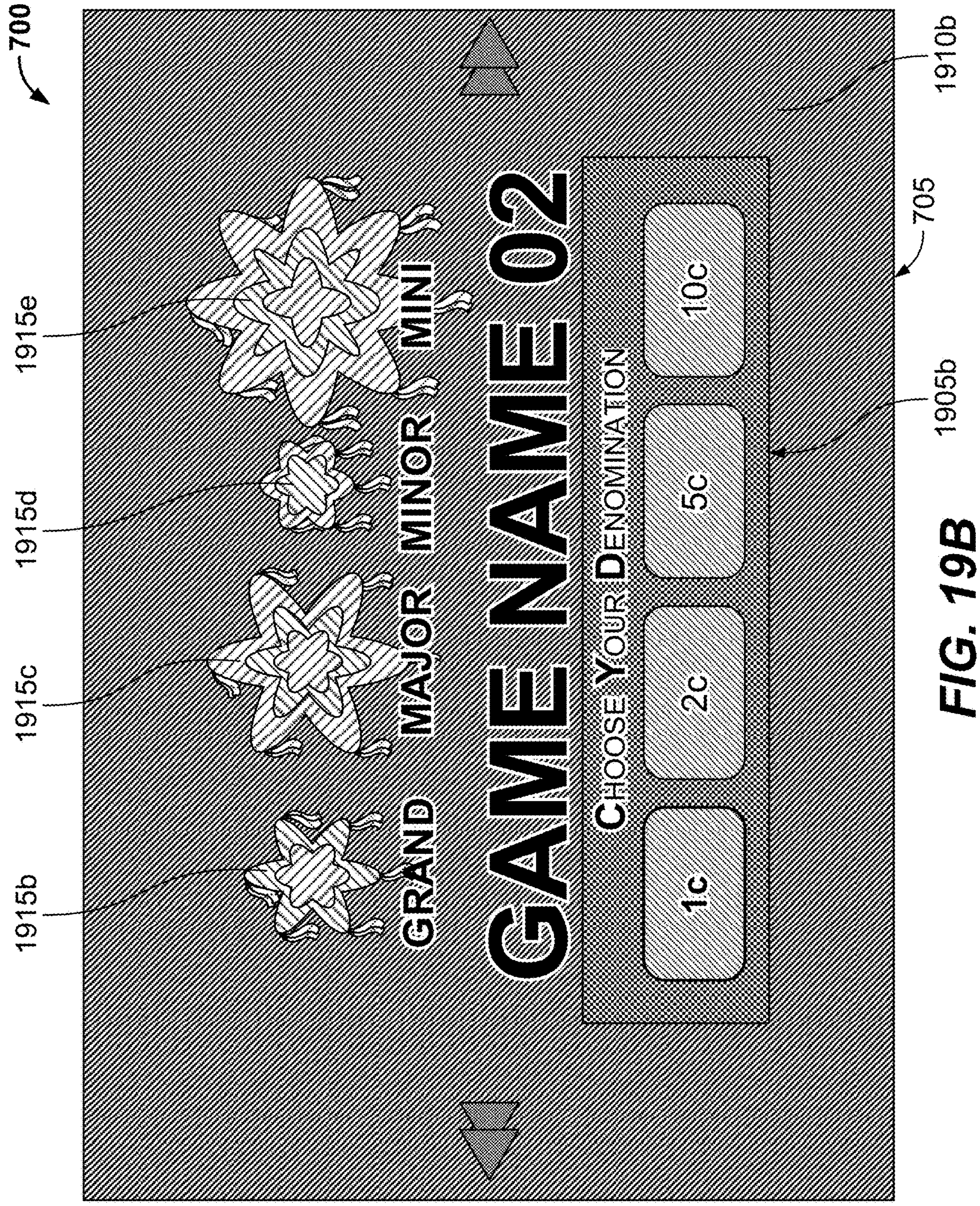
Figure 19C:
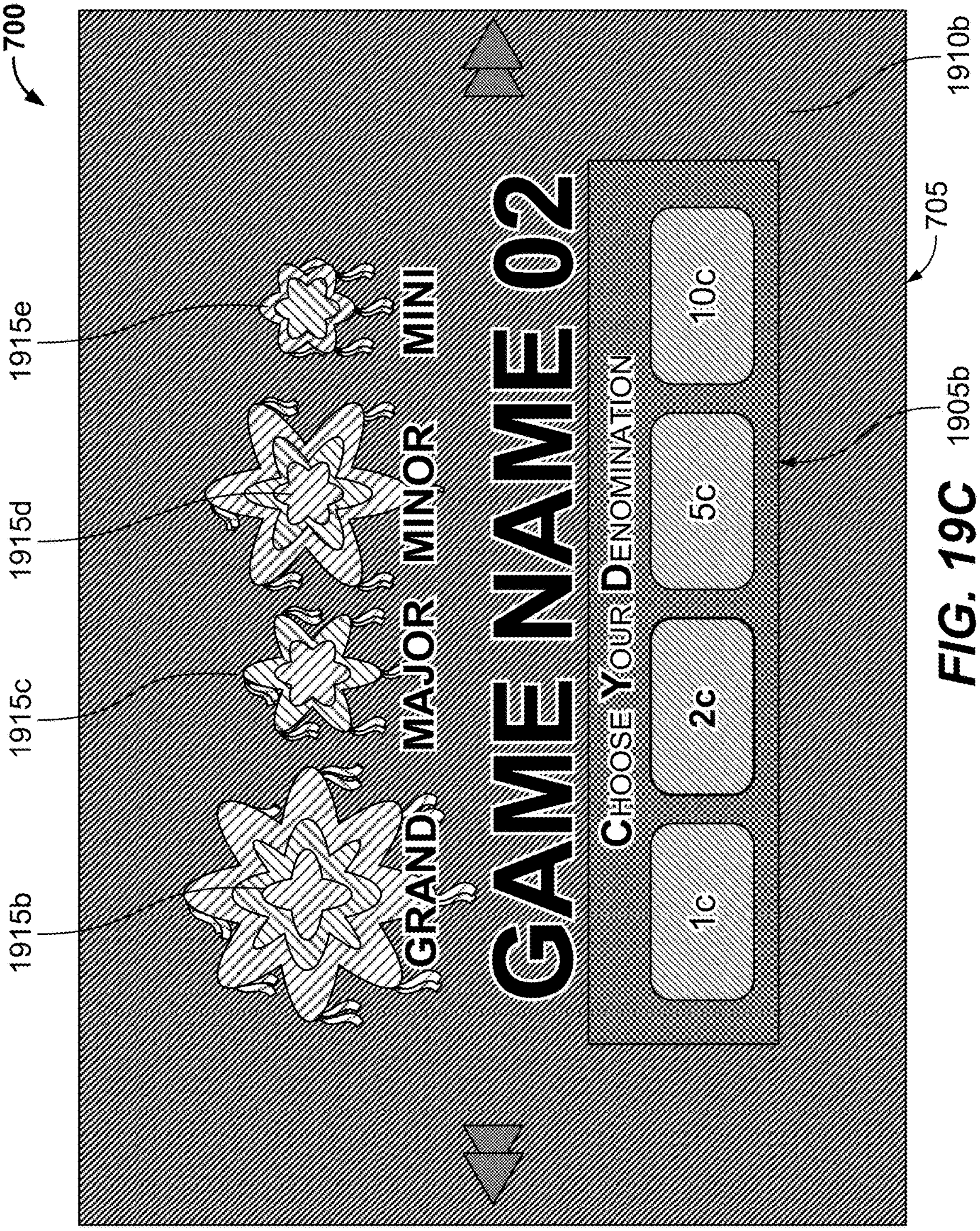
Figure 19D:
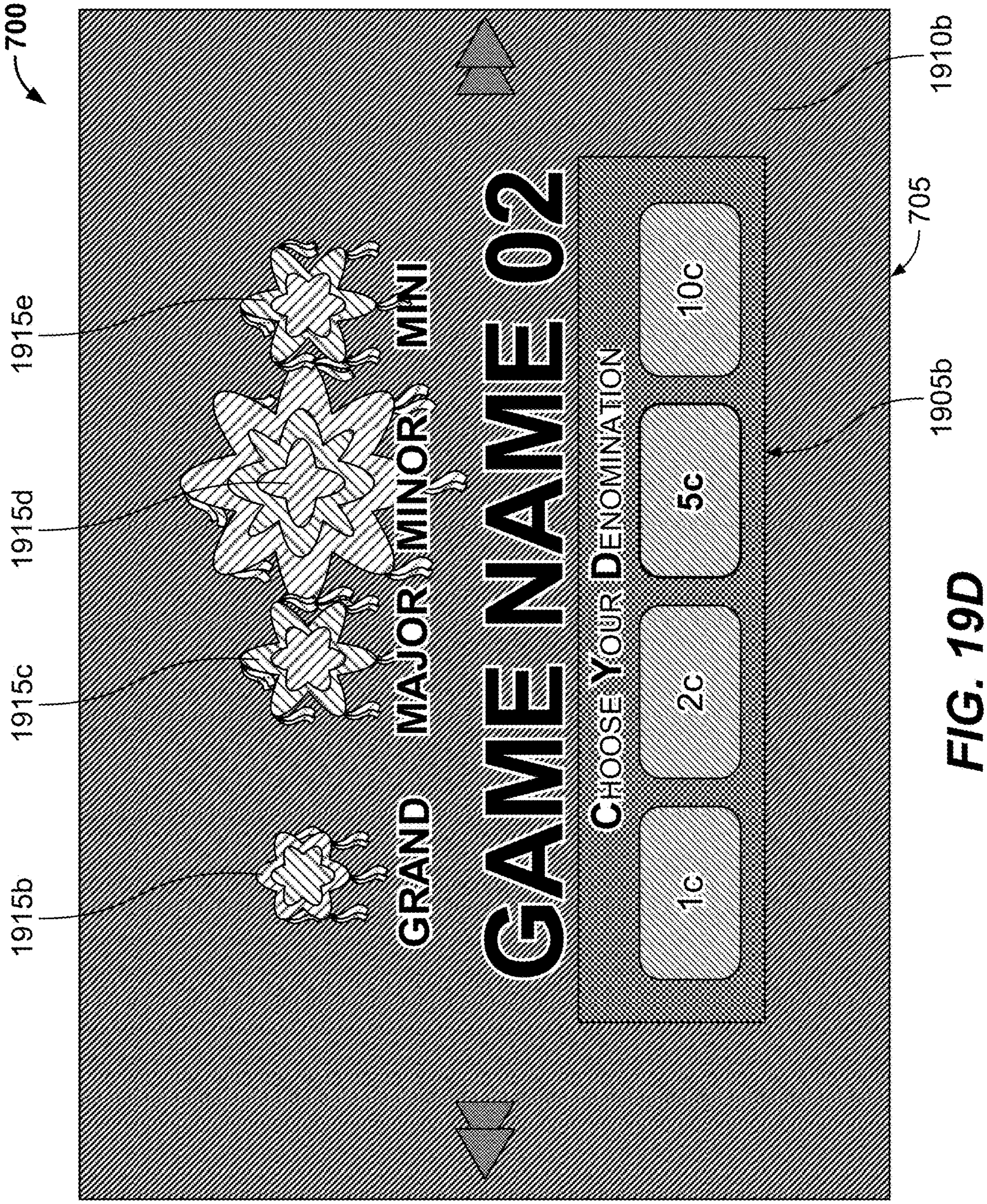

FIGS. 19B-19D show examples of graphical user interfaces that may be presented on a display of a gaming device for selecting a denomination for Game 2 of FIG. 19A. In some such examples, if the gaming device 700 receives an indication that a player has selected a game, e.g., by providing user input relating to a corresponding wagering game image, the gaming device 700 may be configured to control the display system 705 to present a graphical user interface like those of FIGS. 19B-19D.

According to these implementations, the state of the metamorphic images 1915*b*-1915*e* may be different for different selected denominations. In the example shown in FIG. 19B, a player is providing user input to the denomination selection image 1905*b* in order to select a one cent denomination. In response, the gaming device 700 is configured to the display system 705 to present the corresponding states of the metamorphic images 1915*b*-1915*e*. By comparing FIG. 19B with FIG. 19A, the latter of which corresponds to a ten cent denomination, one may see that the states of the metamorphic images 1915*b*-1915*e* are similar for a one cent wager and a ten cent wager.

However, by comparing FIG. 19B with FIG. 19C, the latter of which corresponds to a two cent denomination, one may see that the states of the metamorphic images 1915*b*-1915*e* are very different for a one cent wager and a two cent wager. For example, the state of the metamorphic image 1915*b*, which corresponds to the grand jackpot, is much more evolved for a two cent wager than for a one cent wager.

By comparing FIG. 19C with FIG. 19D, the latter of which corresponds to a five cent denomination, one may see that the states of the metamorphic images 1915*b*-1915*e* are quite different for a five cent wager and a two cent wager. For example, the state of the metamorphic image 1915*b*, which corresponds to the grand jackpot, is much more evolved for a two cent wager than for a five cent wager.

Figure 20A:
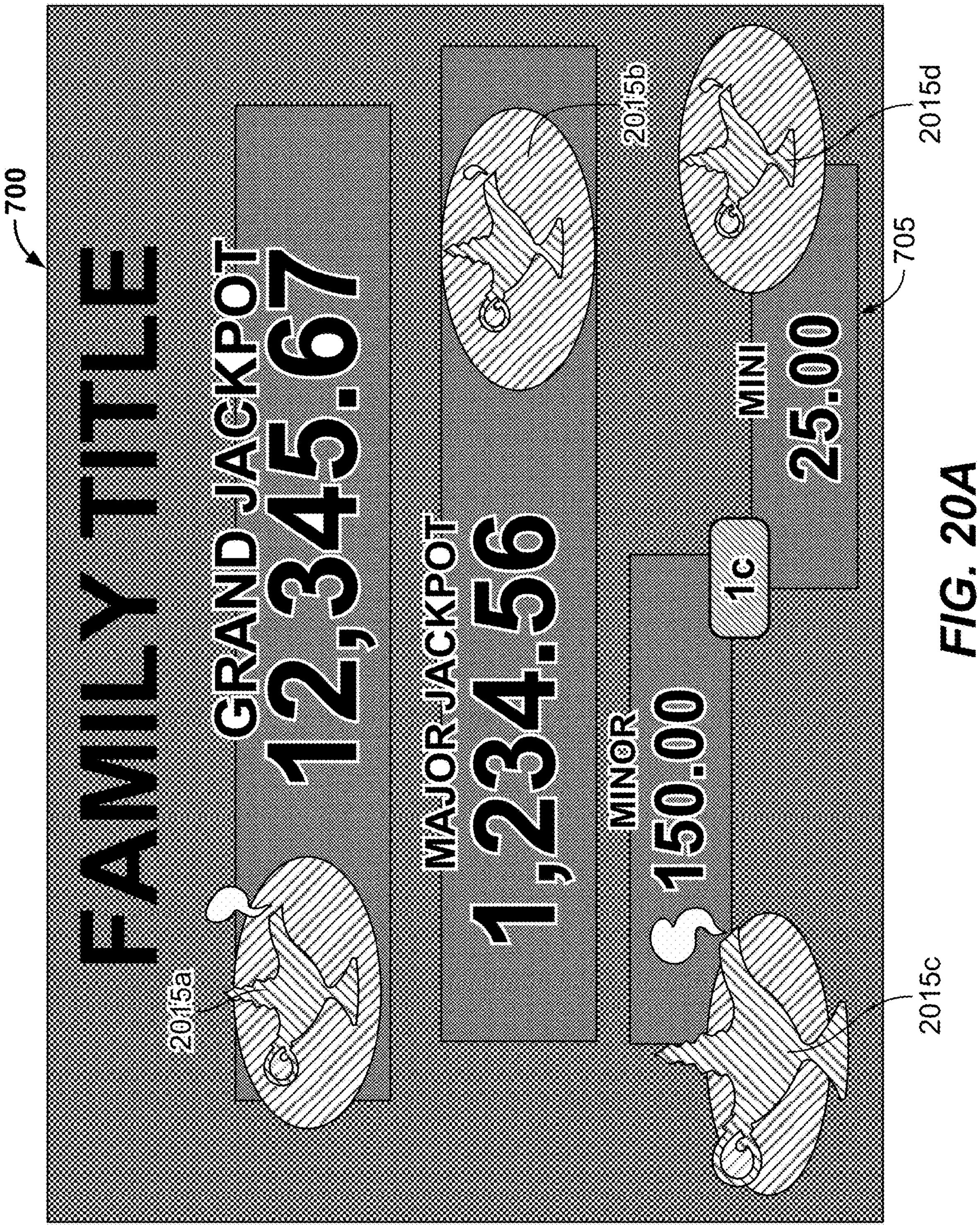
FIGS. 20A and 20B show further examples of gaming device displays presenting metamorphic images.
Figure 20B:
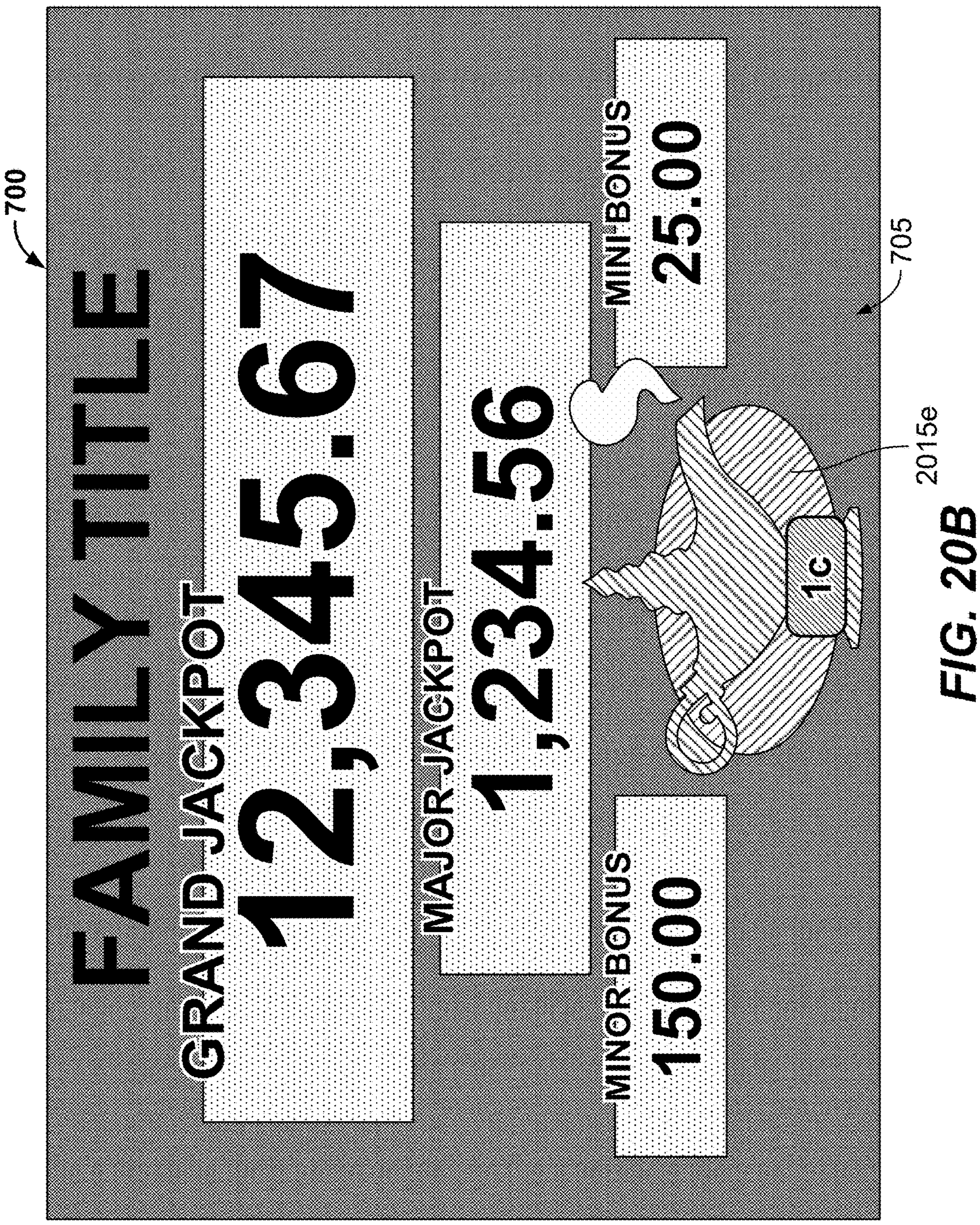

FIGS. 20A and 20B show further examples of gaming device displays presenting metamorphic images. These presentations may, for example, be suitable for display on an upper screen of an EGM, or an upper portion of a single-screen EGM. In Both the example shown in FIG. 20A and the example shown in FIG. 20B correspond to the same denomination, which is one cent in these examples.

According to some implementations, a presentation like that of FIG. 20A and/or FIG. 20B may be made on an upper screen of an EGM, or an upper portion of a single-screen EGM, while a GUI for denomination selection is being presented in a main display of an EGM. For example, a presentation like that of FIG. 20A, which involves metamorphic images 2015*a*-2015*d* corresponding to grand, major, minor and mini jackpots, respectively, may be presented at the same time as a denomination selection screen similar to that of FIG. 19B is being presented. Although the particular types of metamorphic images are different, both examples correspond to a one cent denomination and both examples involve having a single metamorphic image for each of a grand, major, minor and mini jackpot. According to some examples, a presentation like that of FIG. 20B, which involves a single metamorphic image 2015*e* that may or may not corresponding to any particular jackpot, may be presented at the same time as a denomination selection screen for GAME NAME 1 that is shown in FIG. 19A, or a denomination selection screen for a game similar to GAME NAME 1.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming system including one or more servers, comprising:

an interface system including one or more network interfaces; and a control system including one or more processors, the control system being configured for:

sending, via the interface system, instructions for controlling an end user device (EUD) to concurrently present a plurality of wagering game images on an EUD display system, each wagering game image of the plurality of wagering game images corresponding to a game theme and instructions for controlling the EUD display system to concurrently present a plurality of metamorphic images, one or more metamorphic images of the plurality of metamorphic images corresponding to each wagering game image of the plurality of wagering game images, two or more metamorphic images of the plurality of metamorphic images corresponding to at least one wagering game image of the plurality of wagering game images, each metamorphic image of the two or more metamorphic images also corresponding to an award of a plurality of awards potentially available via a wagering game corresponding to the at least one wagering game image, and each metamorphic image being a non-textual image;

receiving, via the interface system and from the EUD, an indication of a selected game theme; and sending, via the interface system, instructions for controlling the EUD display system to present first visual effects corresponding to an instance of the selected game theme and to present a metamorphic image corresponding to the selected game theme.

2. The gaming system of claim 1, wherein each metamorphic image of the two or more metamorphic images corresponds to a bet level.

3. The gaming system of claim 1, wherein the control system is further configured for sending, via the interface system and to the EUD, metamorphic image data that indicates how a display of a metamorphic image should be updated and instructions for controlling the EUD display system to update a display of the metamorphic image according to the metamorphic image data.

4. The gaming system of claim 1, wherein each award corresponds to an amount and each amount is different than the amounts of the other awards.

5. The gaming system of claim 1, wherein at least one metamorphic image corresponds to a probability of a corresponding award being granted.

6. The gaming system of claim 1, wherein each metamorphic image corresponds to a number of game events that have occurred since the award corresponding to that metamorphic image has been granted.

7. The gaming system of claim 1, wherein at least one award comprises a feature award, the feature award comprising an award of one or more bonus games.

8. The gaming system of claim 1, wherein at least one award comprises a progressive jackpot award.

9. A method of controlling an end user device (EUD), the method comprising:

sending, via an interface system including one or more network interfaces, instructions to the EUD for controlling an EUD display system to concurrently present a plurality of wagering game images, each wagering game image of the plurality of wagering game images corresponding to a game theme and instructions for controlling the EUD display system to concurrently present a plurality of metamorphic images, one or more metamorphic images of the plurality of metamorphic images corresponding to each wagering game image of the plurality of wagering game images, two or more metamorphic images of the plurality of metamorphic images corresponding to at least one wagering game image of the plurality of wagering game images, each metamorphic image of the two or more metamorphic images also corresponding to an award of a plurality of awards potentially available via a wagering game corresponding to the at least one wagering game image, and each metamorphic image being a non-textual image;

receiving, via the interface system and from the EUD, an indication of a selected game theme; and sending, via the interface system and to the EUD, instructions for controlling the EUD display system to present first visual effects corresponding to an instance of the selected game theme and to present a metamorphic image corresponding to the selected game theme.

10. The method of claim 9, wherein each metamorphic image of the two or more metamorphic images corresponds to a bet level.

11. The method of claim 9, further comprising:

sending, via the interface system and to the EUD, metamorphic image data that indicates how a display of a metamorphic image should be updated and instructions for controlling the EUD display system to update a display of the metamorphic image according to the metamorphic image data.

12. The method of claim 9, wherein each award corresponds to an amount and each amount is different than the amounts of the other awards.

13. The method of claim 9, wherein at least one metamorphic image corresponds to a probability of a corresponding award being granted.

14. The method of claim 9, wherein each metamorphic image corresponds to a number of game events that have occurred since the award corresponding to that metamorphic image has been granted.

15. One or more non-transitory computer readable media having software stored thereon, the software including instructions for controlling a gaming system including one or more servers to perform a method, the method comprising:

sending, via an interface system including one or more network interfaces, instructions to an end user device (EUD) for controlling an EUD display system to concurrently present a plurality of wagering game images, each wagering game image of the plurality of wagering game images corresponding to a game theme and for controlling the EUD display system to concurrently present a plurality of metamorphic images, one or more metamorphic images of the plurality of metamorphic images corresponding to each wagering game image of the plurality of wagering game images, two or more metamorphic images of the plurality of metamorphic images corresponding to at least one wagering game image of the plurality of wagering game images, each metamorphic image of the two or more metamorphic images also corresponding to an award of a plurality of awards potentially available via a wagering game corresponding to the at least one wagering game image, and each metamorphic image being a non-textual image;

receiving, via the interface system and from the EUD, an indication of a selected game theme; and sending, via the interface system and to the EUD, instructions for controlling the EUD display system to present first visual effects corresponding to an instance of the selected game theme and to present a metamorphic image corresponding to the selected game theme.

16. The one or more non-transitory computer readable media of claim 15, wherein each metamorphic image of the two or more metamorphic images corresponds to a bet level.

17. The one or more non-transitory computer readable media of claim 15, wherein the method further comprises:

sending, via the interface system and to the EUD, metamorphic image data that indicates how a display of a metamorphic image should be updated and instructions for controlling the EUD display system to update a display of the metamorphic image according to the metamorphic image data.

18. The one or more non-transitory computer readable media of claim 15, wherein each award corresponds to an amount and each amount is different than the amounts of the other awards.

19. The one or more non-transitory computer readable media of claim 15, wherein at least one metamorphic image corresponds to a probability of a corresponding award being granted.

20. The one or more non-transitory computer readable media of claim 15, wherein each metamorphic image corresponds to a number of game events that have occurred since the award corresponding to that metamorphic image has been granted.

* * * * *